(12) United States Patent
Park et al.

(10) Patent No.: US 11,140,641 B2
(45) Date of Patent: Oct. 5, 2021

(54) CELLULAR VEHICLE-TO-EVERYTHING OUT OF COVERAGE SYNCHRONIZATION

(71) Applicant: QUALCOMM Incorporated, San Diego, CA (US)

(72) Inventors: Cheol Hee Park, San Diego, CA (US); Feng Lu, Santa Clara, CA (US); Arvind Vardarajan Santhanam, San Diego, CA (US); Subramanya Rao, Sunnyvale, CA (US); Sivaramakrishna Veerepalli, San Diego, CA (US); Cheng Tan, Denver, CO (US); Sean Vincent Maschue, Encinitas, CA (US); Ashish Shankar Iyer, San Diego, CA (US); Giridhar Ramakrishnan, San Diego, CA (US); Yax Patel, San Diego, CA (US); Srinivasan Rajagopalan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 16 days.

(21) Appl. No.: 16/596,619

(22) Filed: Oct. 8, 2019

(65) Prior Publication Data
US 2020/0120625 A1    Apr. 16, 2020

Related U.S. Application Data

(60) Provisional application No. 62/744,555, filed on Oct. 11, 2018, provisional application No. 62/823,494, filed on Mar. 25, 2019.

(51) Int. Cl.
*H04W 56/00* (2009.01)
*H04W 4/40* (2018.01)
(Continued)

(52) U.S. Cl.
CPC ......... *H04W 56/001* (2013.01); *H04W 4/40* (2018.02); *H04W 56/005* (2013.01); *H04W 84/005* (2013.01)

(58) Field of Classification Search
CPC ... H04W 56/001; H04W 4/40; H04W 56/005; H04W 84/005; H04W 80/02; H04W 56/0025
See application file for complete search history.

(56) References Cited

U.S. PATENT DOCUMENTS

| 2012/0094652 A1* | 4/2012 | Kilgour | H04W 56/0035 |
| | | | 455/422.1 |
| 2014/0073323 A1* | 3/2014 | Lee | H04B 7/155 |
| | | | 455/435.1 |

(Continued)

FOREIGN PATENT DOCUMENTS

WO    2018088951 A1    5/2018

OTHER PUBLICATIONS

International Search Report and Written Opinion—PCT/US2019/055430—ISA/EPO—dated Jan. 8, 2020.

*Primary Examiner* — Harry H Kim
(74) *Attorney, Agent, or Firm* — Qualcomm Incorporated

(57) ABSTRACT

Aspects directed towards synchronizing out of coverage (OOC) vehicle-to-everything (V2X) communications are disclosed. In one example, a scheduled entity detects a loss of a synchronization signal associated with a V2X communication by detecting when a timing uncertainty value or error value is greater than a threshold value. Packet timing information is then received in response to the loss of the synchronization signal from at least one user equipment (UE) synchronized with the synchronization signal. The (Continued)

scheduled entity then maintains the V2X communication by performing a timing adjustment based on the packet timing information.

51 Claims, 24 Drawing Sheets

(51) Int. Cl.
*H04W 84/00* (2009.01)
*H04W 80/02* (2009.01)

(56) References Cited

U.S. PATENT DOCUMENTS

| | | | |
|---|---|---|---|
| 2016/0095074 A1* | 3/2016 | Park | H04W 56/001 |
| | | | 370/350 |
| 2017/0289870 A1* | 10/2017 | Liu | H04W 36/0061 |
| 2017/0339670 A1* | 11/2017 | Chae | H04W 72/0446 |
| 2017/0366313 A1* | 12/2017 | Rahman | H04W 72/085 |
| 2018/0310249 A1* | 10/2018 | Wilhelmsson | H04W 52/0241 |
| 2018/0359666 A1* | 12/2018 | Wang | H04W 56/001 |
| 2019/0116565 A1* | 4/2019 | Chae | H04W 24/10 |
| 2020/0059874 A1* | 2/2020 | Noh | H04L 5/0007 |
| 2020/0120627 A1* | 4/2020 | Xie | H04W 56/001 |
| 2020/0177254 A1* | 6/2020 | Lee | H04L 5/0051 |
| 2020/0178048 A1* | 6/2020 | Kim | H04W 4/40 |
| 2020/0322910 A1* | 10/2020 | Zhang | H04W 72/005 |
| 2020/0367185 A1* | 11/2020 | Kim | H04L 27/2607 |

* cited by examiner

CELLULAR VEHICLE-TO-EVERYTHING OUT OF COVERAGE SYNCHRONIZATION

CROSS-REFERENCE TO RELATED APPLICATION(S)

This application claims priority to and the benefit of U.S. Provisional Patent Application No. 62/744,555, filed on Oct. 11, 2018, and U.S. Provisional Patent Application No. 62/823,494, filed on Mar. 25, 2019, wherein the content of each application is incorporated herein by reference as if fully set forth below in its entirety and for all applicable purposes.

TECHNICAL FIELD

The technology discussed below generally relates to wireless communication systems, and more particularly, to a synchronization enhancement for out of coverage (OOC) cellular vehicle-to-everything (C-V2X) communications.

INTRODUCTION

Sidelink communications were initially introduced as a Long Term Evolution (LTE) feature to enable device-to-device (D2D) communications within legacy cellular-based LTE radio access networks. For comparison, in a legacy uplink/downlink, a user equipment (UE) may communicate with another UE through the Uu interface and data always traverses the LTE eNode B (eNB). A sidelink, however, enables the direct communication between proximal UEs using the newly defined PC5 interface so that data does not need to go through the eNB.

Sidelink communications will continue to be supported by 5G New Radio (NR) networks. With respect to vehicle-to-everything (V2X) sidelink communications in particular, it may be desired to keep out of coverage (OOC) UEs synchronized.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a wireless communication device (e.g., a user equipment (UE)) are disclosed. In one example, a method is disclosed, which includes detecting a loss of a synchronization signal associated with a vehicle-to-everything (V2X) communication. For this example, the loss is detected when a timing uncertainty value or error value is greater than a threshold value. The method further includes receiving packet timing information from at least one UE synchronized with the synchronization signal, in response to the loss of the synchronization signal, and maintaining the V2X communication by performing a timing adjustment based on the packet timing information.

In another aspect, a wireless communication device is disclosed. The wireless communication device can include a transceiver, a memory, and a processor coupled to the transceiver and the memory, such that the processor and memory are configured to perform various acts. For example, the processor and memory can be configured to detect a loss of a synchronization signal associated with a V2X communication when a timing uncertainty value or error value is greater than a threshold value. The processor and memory can be further configured to receive packet timing information from at least one UE synchronized with the synchronization signal, in response to the loss of the synchronization signal, and maintain the V2X communication by performing a timing adjustment based on the packet timing information.

In a further aspect, an apparatus for wireless communication is disclosed. The apparatus can include each of a means for detecting, a means for receiving, and a means for maintaining For this example, the means for detecting can be configured to detect a loss of a synchronization signal associated with a V2X communication when a timing uncertainty value or error value is greater than a threshold value. Furthermore, the means for receiving can be configured to receive packet timing information from at least one UE synchronized with the synchronization signal, in response to the loss of the synchronization signal, whereas the means for maintaining can be configured to maintain the V2X communication by performing a timing adjustment based on the packet timing information.

In yet another aspect, a non-transitory computer-readable medium storing computer-executable code is disclosed, which includes code for causing a wireless communication device to perform various acts. For instance, the non-transitory computer-readable medium may include code for causing the wireless communication device to detect a loss of a synchronization signal associated with a V2X communication when a timing uncertainty value or error value is greater than a threshold value. The non-transitory computer-readable medium may further include code for causing the wireless communication device to receive packet timing information from at least one UE synchronized with the synchronization signal, in response to the loss of the synchronization signal, and maintain the V2X communication by performing a timing adjustment based on the packet timing information.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
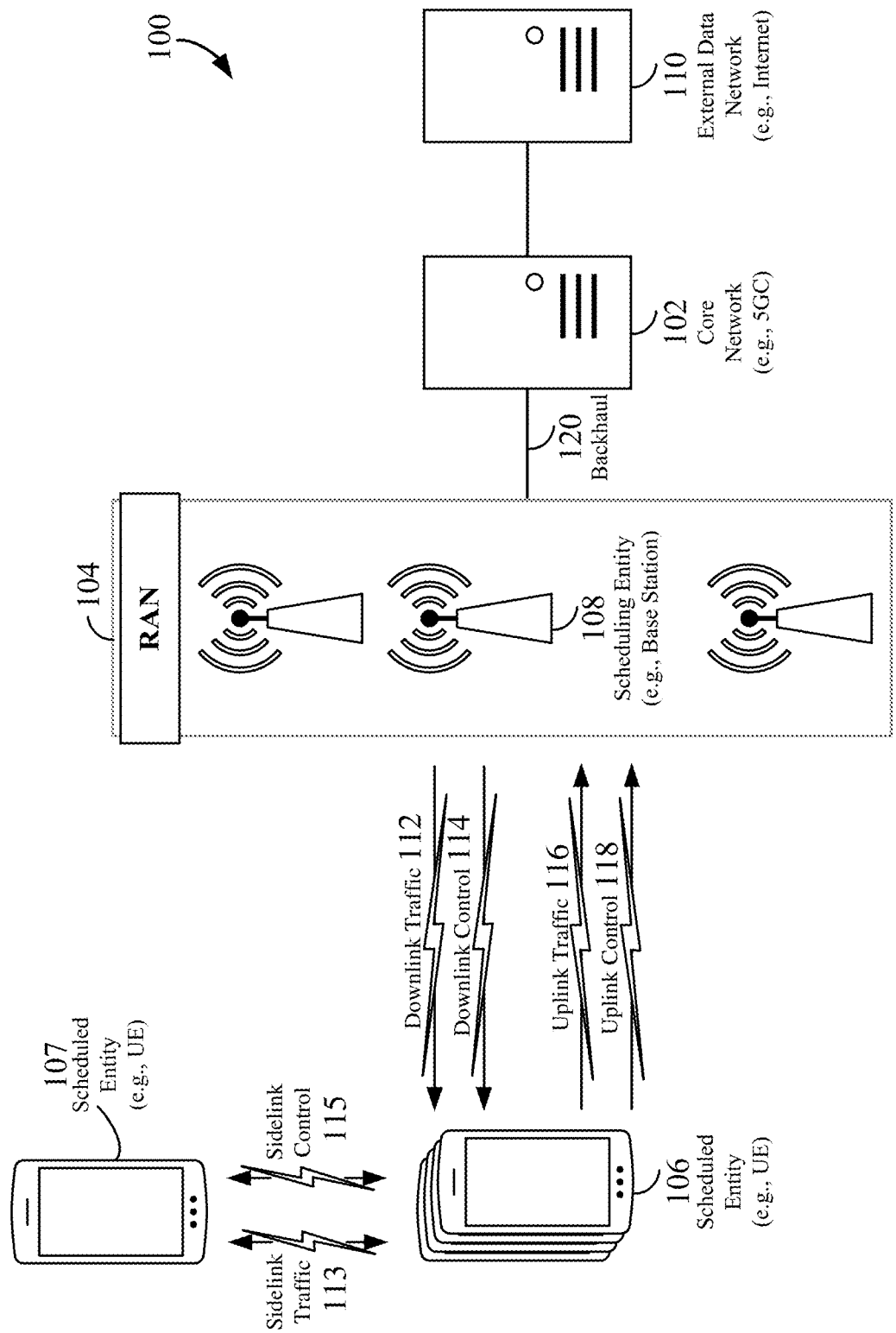
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects disclosed herein are directed towards a synchronization enhancement for out of coverage (OOC) vehicle-to-everything (V2X) communications. Particular aspects are directed towards maintaining a V2X communication when a global navigation satellite system (GNSS) synchronization signal, Serving cell/Pcell, or SyncRef UE reference timing is lost by a user equipment (UE). For instance, rather than suspending the V2X communication, it is contemplated that transmission timing can be maintained by utilizing timing information received from other UEs that remain synchronized. It is further contemplated that such timing adjustments may be performed in any of a plurality of ways including, but not limited to, the exemplary timing adjustments disclosed herein. Also, it should be appreciated that although a GNSS synchronization signal is referenced in various portions of the disclosure, such references are exemplary, wherein it is noted that the aspects disclosed herein are also applicable to other types of synchronization signals (e.g., a Serving cell/PCell signal or SyncRef UE signal).

It should be noted that some of the UEs from which transmissions are received may be less reliable than others. Therefore, treating all UE timings as equally reliable, even if they are synchronized with a dependable source such as GNSS, may lead to inaccurate timing delay estimations. Inaccurate timing may lead to interference and degradation in V2X performance for UEs that have lost synchronization and even for surrounding UEs.

The present disclosure thus discusses, in at least some aspects, systems and methods for obtaining or maintaining accurate timing by accounting for reliability of different V2X devices. For instance, it is contemplated that an unsynchronized UE may be configured to receive timing information from a plurality of synchronized UEs. In at least one aspect, the unsynchronized UE may be configured to perform timing adjustments by generating a weighted time average based on the respective timing information received from the plurality of synchronized UEs. For example, a weighted time average may be generated by using a first weight for a first synchronized UE and a second weight for a second synchronized UE.

It is contemplated that the timing information received from different synchronized UEs may be weighted based on any of various V2X factors. Thus, instead of equally weighing timing information received from synchronized UEs, some aspects may more heavily weight the timing of a device based on C-V2X and higher layer driven factors (such as a higher layer 3GPP or system architecture evolution (SAE) parameter). In an aspect, if the factor(s) associated with the timing of a device is below a threshold, the timing information received from that device may be not used (e.g., is given a weight of 0) in determining the timing for the unsynchronized V2X device. If the factor(s) is above the threshold, the weight assigned to the received timing information may vary based on the particulars of the factor(s). In various aspects, the threshold may be a floor threshold, in which anything below the threshold may be discarded while in other aspects the threshold may be a roof threshold in which anything above the threshold will be discarded. These computations may be performed at a receiving device that is deriving timing data from multiple peer (V2X or C-V2X) devices. By basing the derived timing and/or the weights corresponding to a different device based on the packet timing as well as higher layer parameters, a better accuracy in UE transmission timing may be achieved. Weighting based on these factors is an exemplary way of achieving higher reliability in timing adjustment based on delay estimates. The weighting and prioritization may be based on application requirements. This improved accuracy and/or containment of timing drift may allow for sustained C-V2X transmission/reception even when synchronization with a network or GNSS system has been lost. This improved accuracy may help maintain satisfactory timing performance for longer periods of time. The improved accuracy and containment of timing drift may also reduce interference which may otherwise result from incorrect timing.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
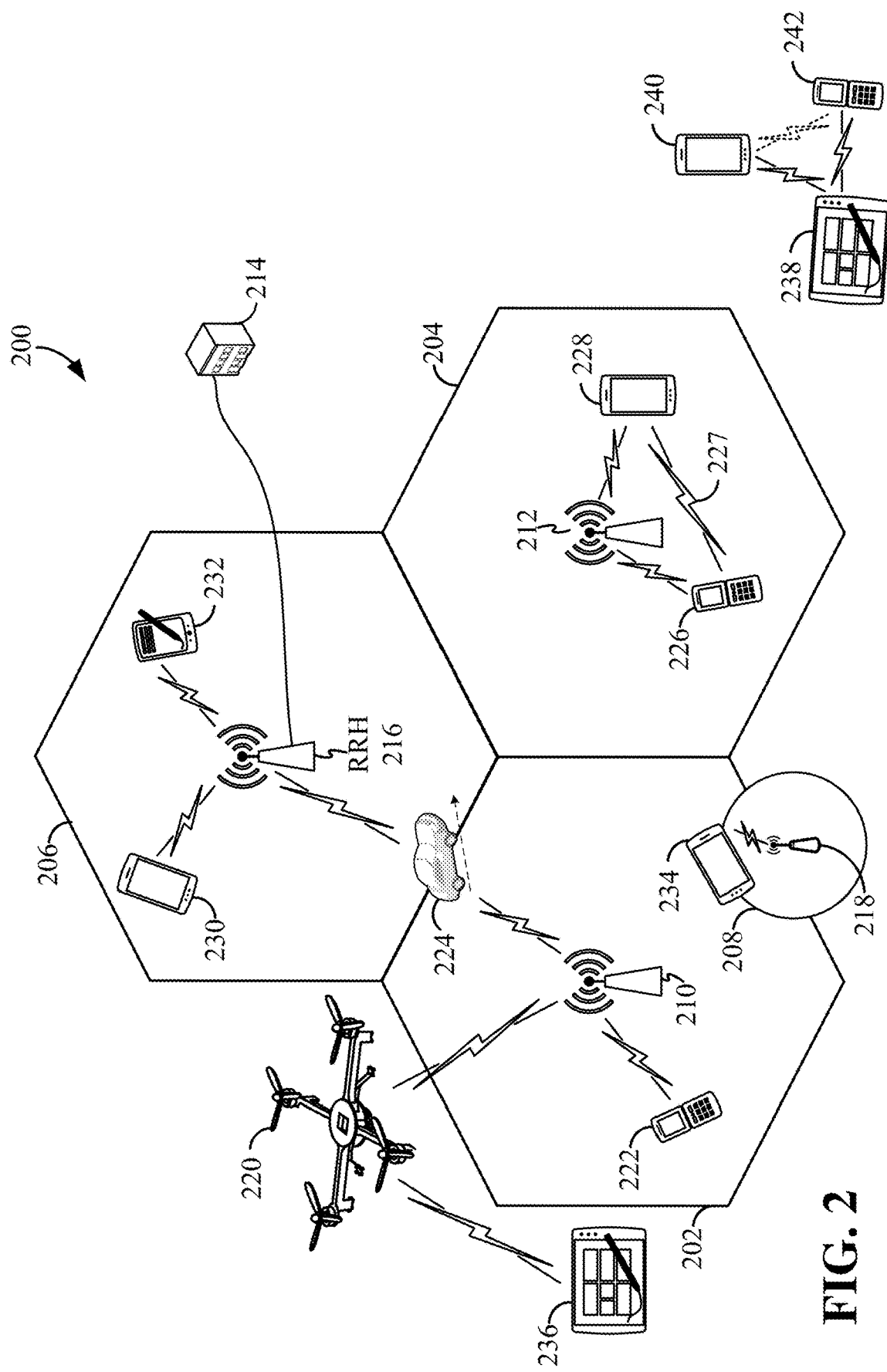
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), vehicle-to-vehicle (V2V), vehicle-to-everything (V2X), and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, scheduled entities such as a first scheduled entity 106 and a second scheduled entity 107 may utilize sidelink signals for direct D2D communication (e.g., a V2X communication). Sidelink signals may include sidelink traffic 113 and sidelink control 115. In some examples, the sidelink control 115 may include synchronization information to synchronize communication on the sidelink channel. In addition, the sidelink control 115 may include scheduling information indicating one or more resource blocks reserved by the transmitting sidelink device to transmit the sidelink traffic 113 to the receiving sidelink device. In some examples, the scheduling information may further include information related to the traffic 113, such as a modulation and coding scheme utilized for the traffic 113. In some examples, the sidelink control 115 may be transmitted within a physical sidelink control channel (PSCCH), while the sidelink data 130 may be transmitted within a physical sidelink shared channel (PSSCH).

In certain aspects, a scheduled entity 106 that is OOC and has lost synchronization with a synchronization source on which a V2X communication is based, may maintain the V2X communication based on packet timing information received from other synchronized devices (e.g., scheduled entity 107). The timing for the V2X communication may further be based on parameter values from a higher layer of the respective other synchronized devices. By way of example, the scheduled entity 106 may receive a PC5 transmission from two or more peer UEs including a first scheduled entity and a second scheduled entity. If the first scheduled entity has low propagation delay and a high time confidence as seen by the scheduled entity 106, a timing estimate based on the first scheduled entity may be better (i.e. closer to satellite timing) than a timing estimate based on the timing of the second scheduled entity, which may have high propagation delay and low time confidence. Higher layer metrics, such as a time confidence parameter, positional uncertainty parameter, or others can be obtained from a higher layer message. One example of a higher layer message that incudes this information is a basic safety message which may be required by certain communication standards. In some cases, a basic safety message is transmitted periodically, such as every 100 milliseconds. Based on the higher layer parameters, the scheduled entity 106 can determine how much priority (i.e., trust or weight) to give to packets from particular scheduled entities. Although some devices may have a better timing estimate, those with smaller estimates can still help improve the accuracy of a calculated timing as the calculated timing may be statistically improved by using timing estimates from a larger number of peer devices. In some cases a weight of zero may be applied to effectively remove an estimate for a specific peer device from the computed timing adjustment. In other cases, a non-zero weight for a first scheduled entity may be assigned that is less than a non-zero weight of a second scheduled entity. Further discussion of generating weights for a specific scheduled entity and for calculating a weighted timing adjustment is provided below.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
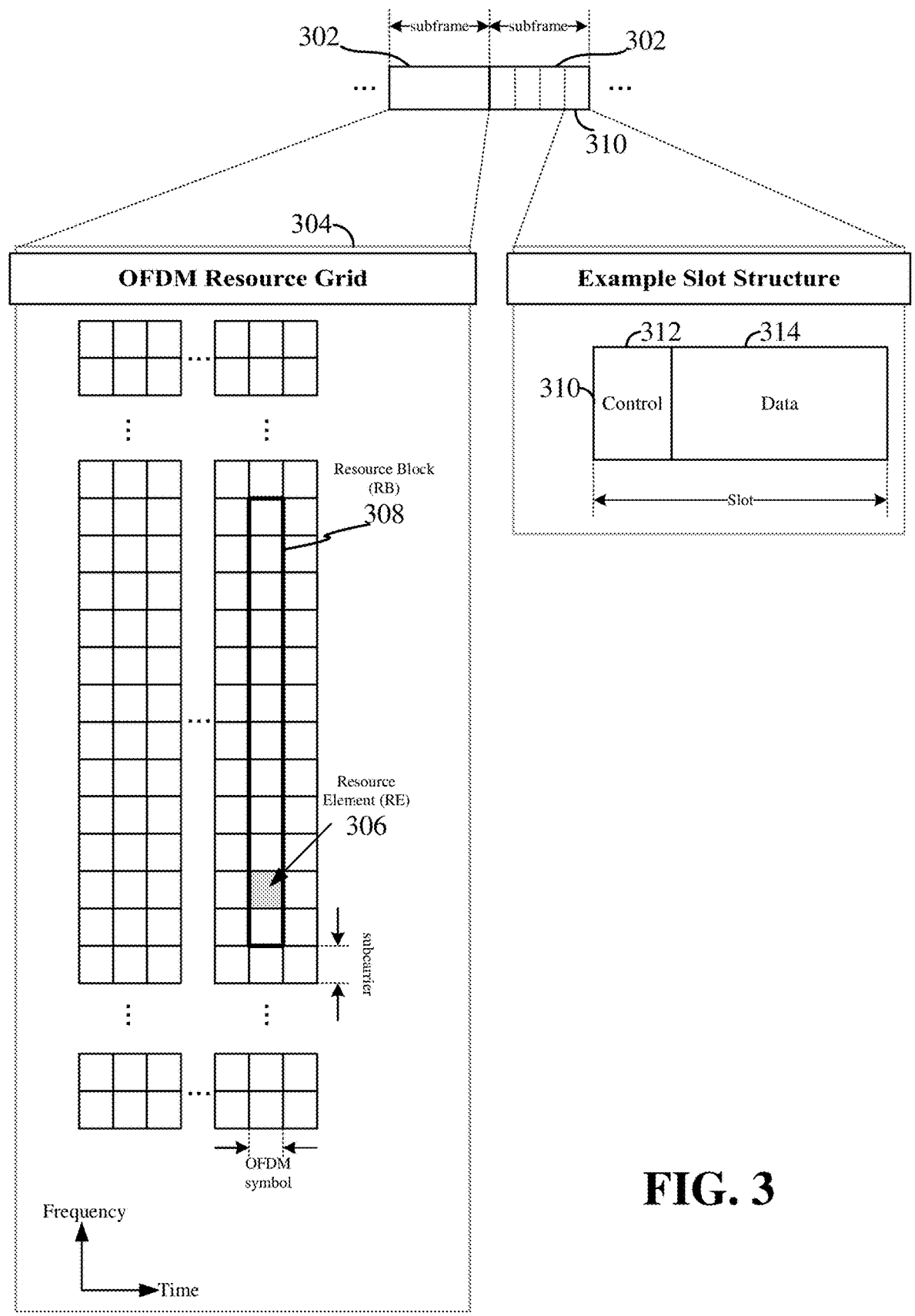
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
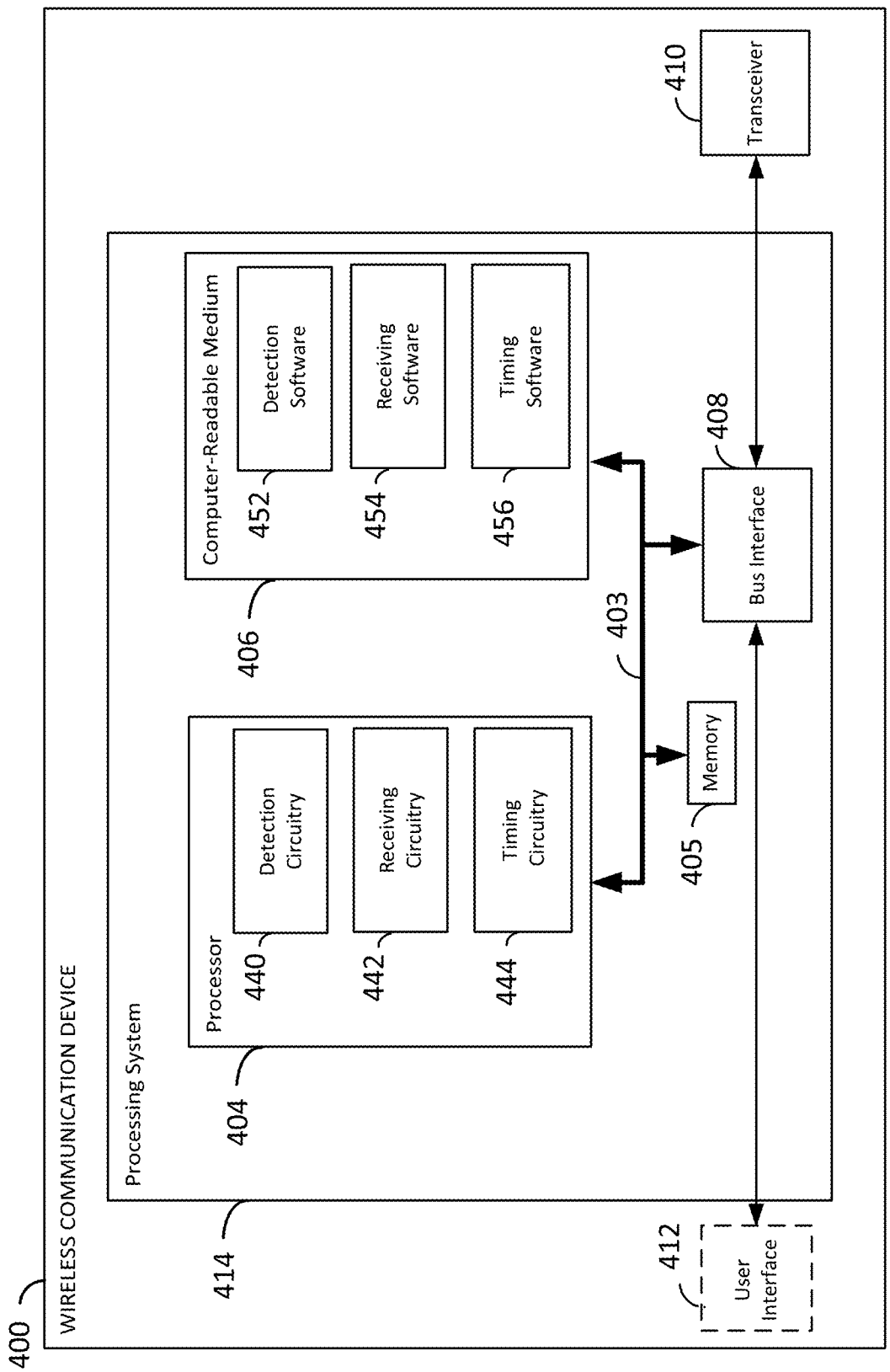
FIG. 4 is a block diagram illustrating an example of a hardware implementation for a wireless communication device employing a processing system in accordance with aspects disclosed herein.

FIG. 4 is a block diagram illustrating an example of a hardware implementation for a wireless communication device 400 employing a processing system 414. For example, the wireless communication device 400 may be a UE as illustrated in any one or more of the FIGs. disclosed herein.

The wireless communication device 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 400 may be configured to perform any one or more of the functions described herein. That is, the processor 404, as utilized in a wireless communication device 400, may be used to implement any one or more of the processes and procedures described below and illustrated in FIGS. 5-6.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided.

In some aspects of the disclosure, the processor 404 may include a detection circuitry 440 configured for various functions, including, for example, to detect a loss of a synchronization signal associated with a V2X communication (e.g., a GNSS, a Serving cell/PCell signal, or a SyncRef UE signal), wherein the loss is detected when a timing uncertainty value or error value is greater than a threshold value. As illustrated, the processor 404 may also include a receiving circuitry 442 configured for various functions. For instance, the receiving circuitry 442 may be configured to receive packet timing information from at least one UE synchronized with the synchronization signal, wherein the packet timing information is received in response to the loss of the synchronization signal. The processor 404 may further include a timing circuitry 444 configured for various functions, including, for example, to maintain the V2X communication by performing a timing adjustment based on the packet timing information. It should also be appreciated that, the combination of the detection circuitry 440, the receiving circuitry 442, and the timing circuitry 444 may be configured to implement one or more of the functions described herein.

Various other aspects for wireless communication device 400 are also contemplated. For instance, it is contemplated that the timing circuitry 444 may be configured to perform timing adjustments in any of a plurality of ways, including the timing adjustments described with reference to any the FIGS. disclosed herein. It should also be appreciated that, although a GNSS synchronization signal is referenced in various portions of the disclosure, such references are exemplary, wherein it is noted that the aspects disclosed herein are also applicable to other types of synchronization signals (e.g., a Serving cell/PCell signal or SyncRef UE signal).

In a particular aspect of the disclosure, it is contemplated that the timing circuitry 444 may be configured to ascertain a packet arrival time estimate associated with the receiving of packet timing information from other UEs (e.g., UEs that are GNSS-synced), and further configured to adjust a subframe (SF) boundary based on the packet arrival time estimate. Here, it should be appreciated that such packet arrival time estimate may include compensating for any of various parameters. For instance, a packet arrival time estimate may include a propagation delay, wherein the timing circuitry 444 may be configured to perform timing adjustments by compensating for a propagation delay estimate. The timing circuitry 444 may thus be configured to subtract or otherwise compensate for a propagation delay estimate from the packet arrival time.

In another aspect of the disclosure, it is noted that the wireless communication device 400 may occasionally receive packet timing information from malicious UEs, which should not be used for timing adjustments. Accordingly, it is contemplated that the receiving circuitry 442 may be configured to differentiate between reliable packet timing information and malicious packet timing information to ensure that the timing circuitry 444 only performs timing adjustments based on packet timing information received from trusted UEs. In a particular implementation, such feature might be enabled only when the wireless communication device 400 is in GNSS out-of-coverage (OOC) and a UE-assisted timing adjustment mode.

A level of confidence may also be associated with various parameters of the packet timing information received from other UEs. For instance, it is contemplated that the timing circuitry 444 may be configured to perform timing adjustments based on time confidence information associated with the packet timing information, and/or based on location confidence information associated with the packet timing information.

In another aspect of the disclosure, it is contemplated that a time drift estimation (e.g., a wireless wide area network (WWAN) downlink (DL) timing drift estimation) may be considered when performing time adjustments. For instance, the timing circuitry 444 may be configured to perform timing adjustments based on a DL timing drift estimation, wherein such estimation is applied to the V2X SF boundary timing.

Various other aspects are also contemplated for the wireless communication device 400. For instance, it is contemplated that configuring the wireless communication device 400 to include a receive-only period upon detecting that a reference signal has been lost may be desirable. Accordingly, the detection circuitry 440 may be configured to commence a receive-only period in response to detecting the loss of the synchronization signal, wherein the timing circuitry 444 may then be configured to limit timing adjustment calculations to within the receive-only period. It is also contemplated that the timing circuitry 444 may be configured to limit an amount of the timing adjustment based on a timing uncertainty value.

Referring back to the remaining components of wireless communication device 400, similar to processor 404, processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. Similar to computer-readable medium 406, computer-readable medium 406 may be a non-transitory computer-readable medium comprising characteristics that are substantially similar. The computer-readable medium 406 may reside in the processing system 414, external to the processing system 414, or distributed across multiple entities including the processing system 414. It should also be appreciated that, similar to computer-readable medium 406, computer-readable medium 406 may be embodied in a computer program product comprising characteristics that are substantially similar.

In one or more examples, the computer-readable storage medium 406 may include detection software 452 configured for various functions, including, for example, to detect a loss of a synchronization signal associated with a V2X communication (e.g., a GNSS, a Serving cell/PCell signal, or SyncRef UE signal) when a timing uncertainty value or error value is greater than a threshold value. As illustrated, the computer-readable medium 406 may also include receiving software 454 configured for various functions. For instance, the receiving software 454 may be configured to receive packet timing information from at least one UE synchronized with the synchronization signal in response to the loss of the synchronization signal. The computer-readable medium 406 may further include timing software 456 configured for various functions, including, for example, to maintain the V2X communication by performing a timing adjustment based on the packet timing information. It should also be appreciated that, the combination of the detection software 452, the receiving software 454, and the timing software 456 may be configured to implement one or more of the functions described herein.

In a particular configuration, it is also contemplated that the wireless communication device 400 includes means for detecting a loss of a synchronization signal associated with a V2X communication when a timing uncertainty value or error value is greater than a threshold value; means for receiving packet timing information from at least one UE synchronized with the synchronization signal in response to the loss of the synchronization signal; and means for maintaining the V2X communication by performing a timing adjustment based on the packet timing information. In one aspect, the aforementioned means may be the processor(s) 404 configured to perform the functions recited by the aforementioned means. In another aspect, the aforementioned means may be a circuit or any apparatus configured to perform the functions recited by the aforementioned means.

Figure 5:
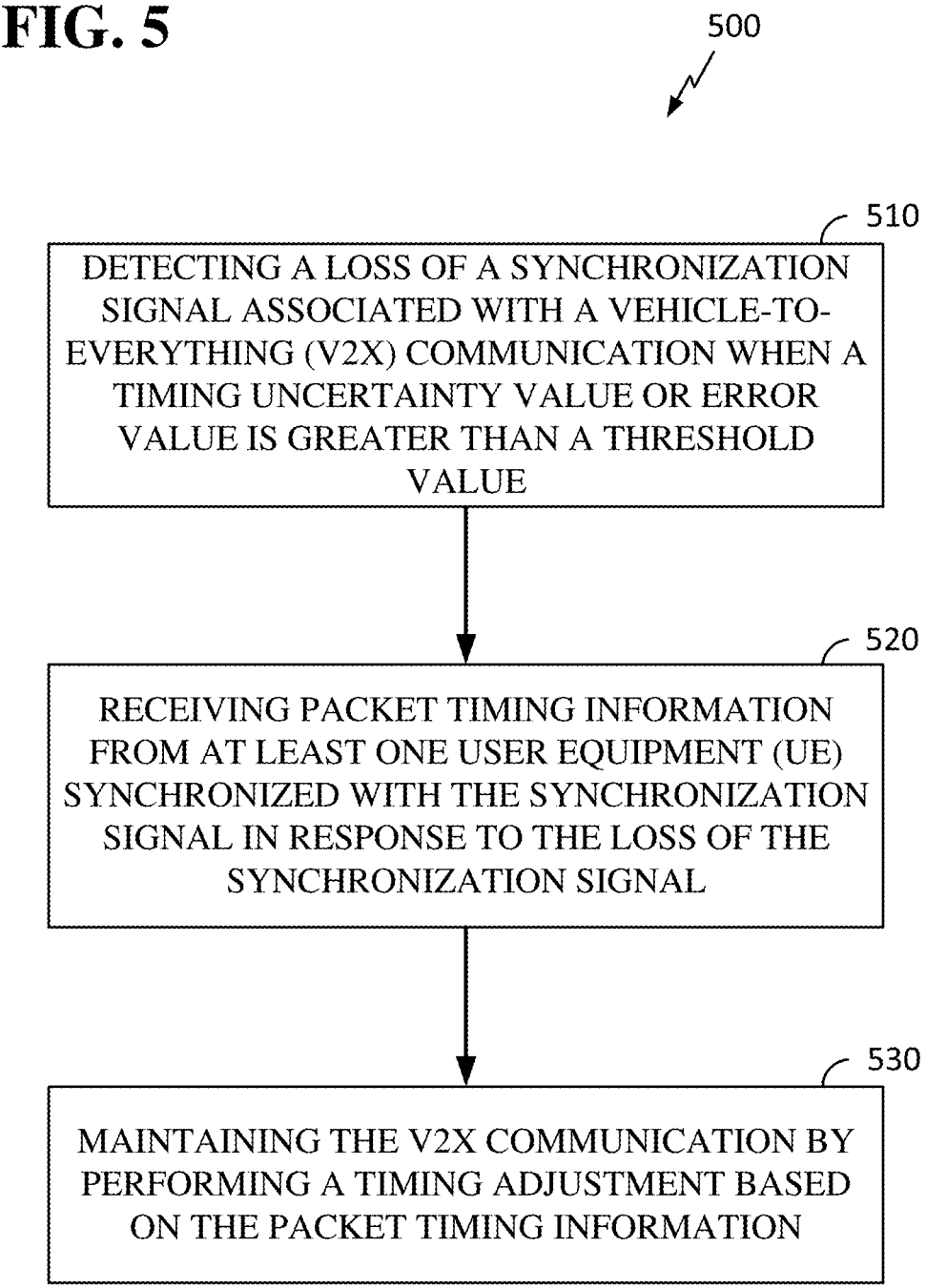
FIG. 5 is a flow chart illustrating an exemplary wireless communication device process that facilitates some aspects of the disclosure.
Figure 6:
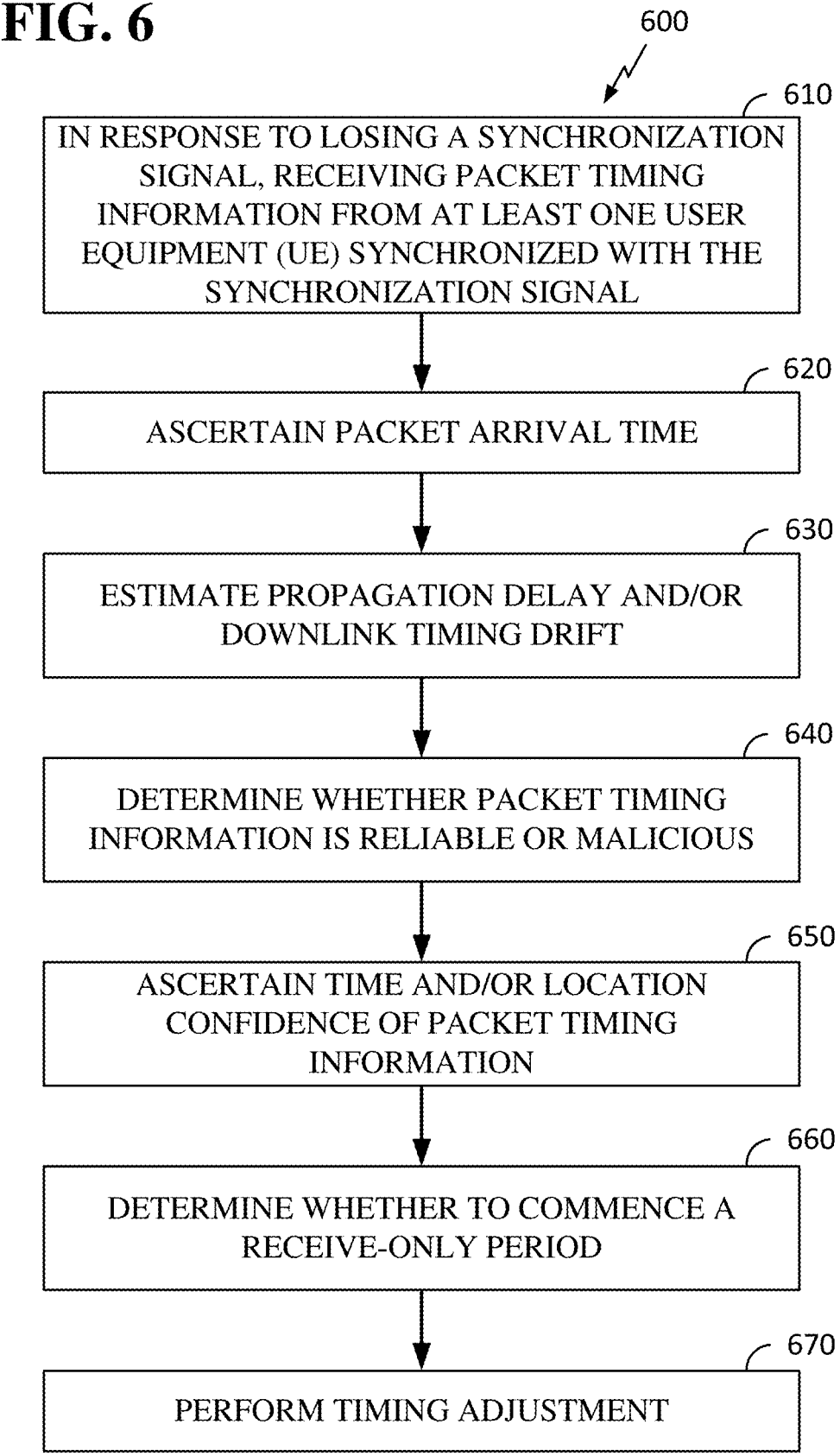
FIG. 6 is a flow chart illustrating an exemplary process that facilitates performing a timing adjustment in accordance with aspects disclosed herein.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described herein, and utilizing, for example, the processes and/or algorithms described in relation to FIGS. 5-6.

In FIG. 5, a flow chart is provided, which illustrates an exemplary wireless communication device process for performing some aspects of the disclosure. As described below, some or all illustrated features may be omitted in a particular implementation within the scope of the present disclosure, and some illustrated features may not be required for implementation of all embodiments. In some examples, the process 500 may be carried out by the wireless communication device 400 illustrated in FIG. 4. In some examples, the process 500 may be carried out by any suitable apparatus or means for carrying out the functions or algorithm described below.

Process 500 begins at block 510 with the wireless communication device 400 detecting a loss of a synchronization signal (e.g., a GNSS, Serving cell/PCell, or SyncRef UE signal) associated with a V2X communication when a timing uncertainty value or error value is greater than a threshold value. At block 520, process 500 continues with the wireless communication device 400 receiving packet timing information from at least one UE synchronized with the synchronization signal in response to the loss of the synchronization signal. Process 500 then concludes block 530 where the wireless communication device 400 maintains the V2X communication by performing a timing adjustment based on the packet timing information.

Referring next to FIG. 6, a flow chart is provided illustrating an exemplary process that facilitates performing timing adjustments in accordance with aspects disclosed herein. As described below, some or all illustrated features may be omitted in a particular implementation within the scope of the present disclosure, and some illustrated features may not be required for implementation of all embodiments. In some examples, the process 600 may be carried out by the wireless communication device 400 illustrated in FIG. 4. In some examples, the process 600 may be carried out by any suitable apparatus or means for carrying out the functions or algorithm described below.

Process 600 begins at block 610 with the wireless communication device 400, in response to losing a synchronization signal, receiving packet timing information from at least one UE synchronized with the synchronization signal. At block 620, the wireless communication device 400 then ascertains a packet arrival time for the packet timing information, and subsequently estimates a propagation delay and/or downlink timing drift associated with the packet timing information at block 630.

As previously stated, it is anticipated that the wireless communication device 400 may occasionally receive packet timing information from malicious UEs, which should not be used for timing adjustments. Accordingly, at block 640, the wireless communication device 400 determines whether the packet timing information is reliable or malicious to ensure that timing adjustments are only based on packet timing information received from trusted UEs. In a particular implementation, such feature might be enabled only when the wireless communication device 400 is in GNSS OOC and a UE-assisted timing adjustment mode.

A level of confidence associated with any of various parameters of the packet timing information received from other UEs may also be ascertained. For instance, at block 650, it is contemplated that the wireless communication device 400 may ascertain time confidence information and/or location confidence information associated with the packet timing information.

As previously stated, it may be desirable to configure the wireless communication device 400 to operate in a receive-only mode upon detecting that a reference signal has been lost. Accordingly, at block 660, the wireless communication device 400 determines whether to commence a receive-only period in response to detecting the loss of the synchronization signal. If so, the wireless communication device 400 may then limit timing adjustment calculations to within the receive-only period. It is also contemplated that the wireless communication device 400 may limit an amount of the timing adjustment based on a timing uncertainty value.

At block 670, the process 600 then concludes with the wireless communication device 400 performing a timing adjustment. Here, it is contemplated that the timing adjustment performed at block 670 may be based on any of the information collected during the process 600.

Particular implementations of the aspects disclosed herein are now described with reference to FIGS. 7-22. Here, it should again be appreciated that although a GNSS synchronization signal is referenced in various portions, such references are exemplary, wherein it is noted that other types of synchronization signals (e.g., a Serving cell/PCell signal or SyncRef UE signal) may also be applicable. With respect to GNSS synchronization in particular, however, various GNSS-specific requirements are noted herein.

Transmission timing requirements, for instance, may dictate that a transmission timing offset be within a predetermined distance from the GNSS reference time. Such offset may also be referred to as a timing uncertainty $T_{unc}$. In a particular example, after a UE is synchronized to a GNSS synchronization source, the test system may verify whether offsets corresponding to the UE Physical Sidelink Shared Channel (PSSCH) and Physical Sidelink Control Channel (PSCCH) are within $\pm 12\ T_s$ (i.e., where $T_s = \frac{1}{15000}$ Hz/2048) of the GNSS reference time.

Transmission frequency requirements may also be imposed to ensure that a frequency uncertainty $F_{unc}$ is accurate within a threshold amount. For example, such requirements may dictate that a UE modulated carrier frequency for V2X sidelink transmissions shall be accurate to within ±0.1 parts per million (PPM) observed over a period of one time slot (0.5 ms) compared to an absolute frequency when a GNSS synchronization source is used.

Figure 7:
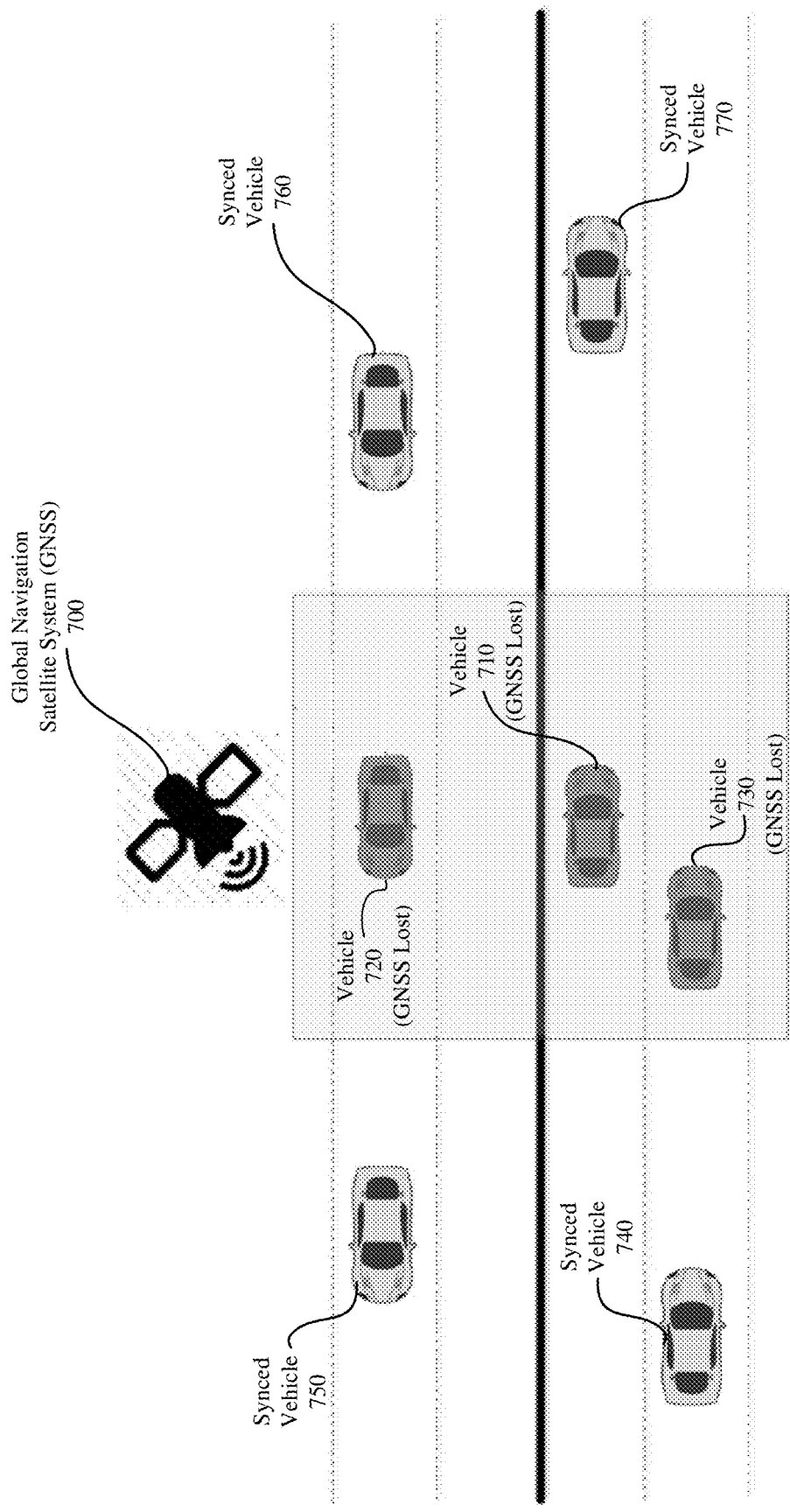
FIG. 7 is a conceptual illustration of vehicles in communication with a global navigation satellite system (GNSS) in accordance with aspects of the disclosure.

Referring next to FIG. 7, a conceptual illustration is provided of vehicles in communication with a GNSS in accordance with aspects of the disclosure. As illustrated, a GNSS 700 may transmit a GNSS synchronization signal, wherein some vehicles 740, 750, 760, and 770 remain synchronized with the GNSS 700, whereas other vehicles 710, 720, and 730 may no longer be synchronized with the GNSS 700. In conventional systems, because C-V2X requires very accurate timing to operate physical layer procedures, a UE is typically configured to suspend C-V2X transmissions. Aspects disclosed herein, however, contemplate configurations in which receive timing requirements are relaxed and left for UE implementation.

Figure 8:
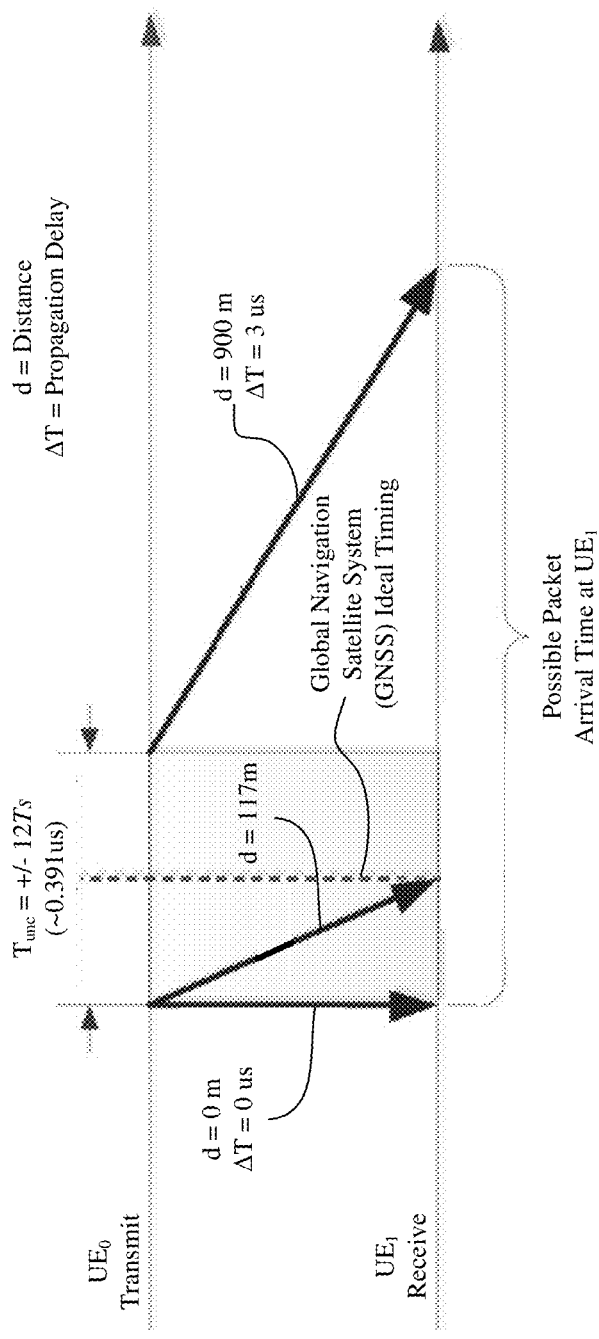
FIG. 8 is a timing diagram illustrating an exemplary timing for a GNSS-synced UE to receive a C-V2X transmission from another UE in accordance with aspects of the disclosure.
Figure 9:
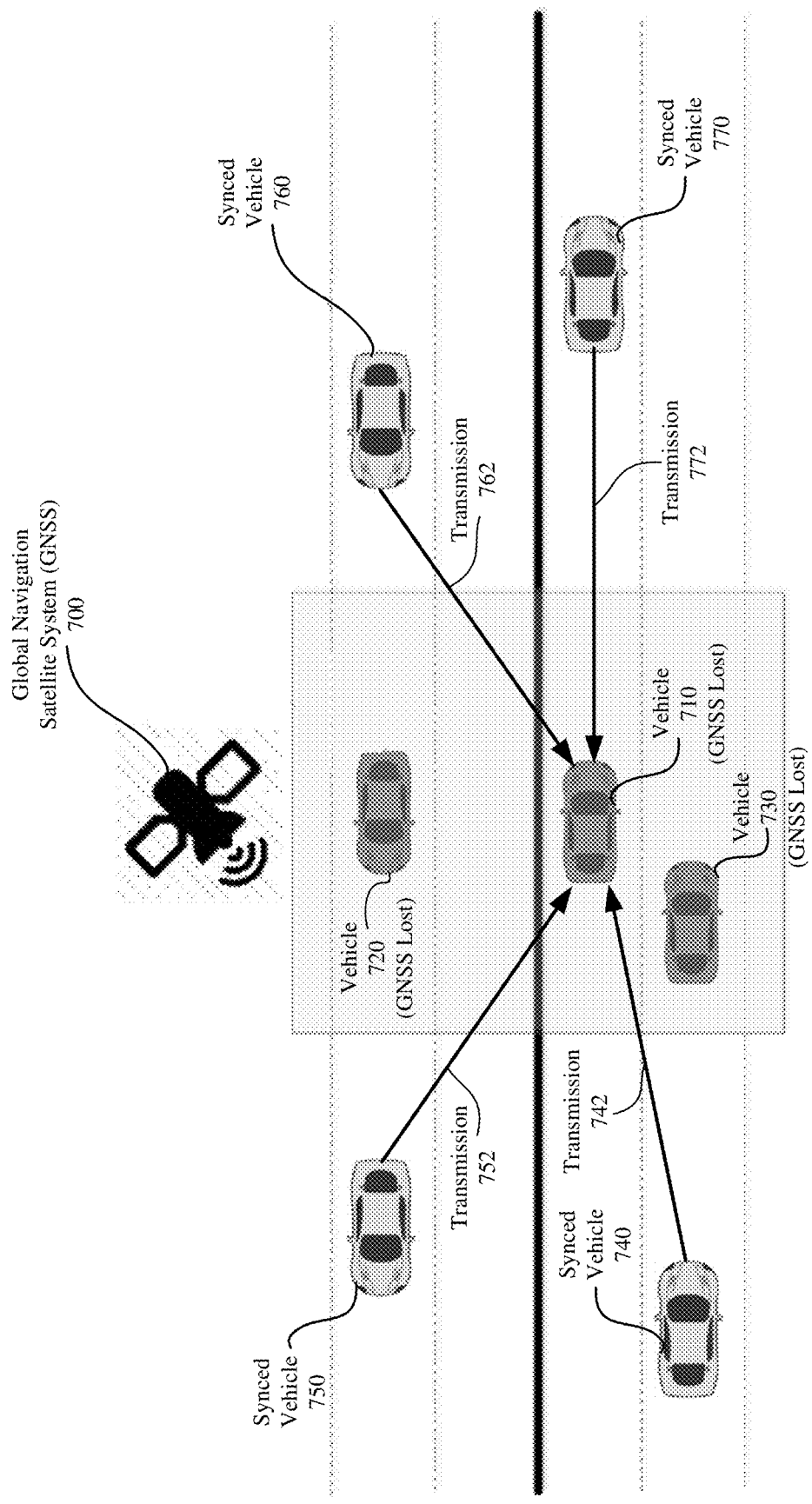
FIG. 9 is a conceptual illustration of vehicle receiving assistance from synchronized vehicles in accordance with aspects of the disclosure.

Referring next to FIG. 8, a timing diagram is provided to illustrate exemplary timing for a GNSS-synced UE to receive a C-V2X transmission from another UE. For this particular example, successful decoding of transmissions from a transmitting UE (i.e., $UE_0$) at a receiving UE (i.e., $UE_1$) may be based on:

$$|\Delta t_{unc}| \leq T_{CP} - \tau_{del} - \Delta t_{pd}$$

where $\Delta t_{unc}$ is the time difference between UE$_0$ and UE$_1$;

$T_{CP}$ is the CP length, which is approximately 4.7 us (NOTE: $T_{CP}$ may be assumed to be the receive time window for successful packet decoding (e.g., for QPSK, $T_{CP}$ could be up to 15 us));

$\tau_{del}$ is the channel delay spread; and $\Delta t_{pd}$=d/c is the propagation delay.

It can be further assumed that, if $T_{unc}$=391 ns, $\Delta t_{pd}\approx 3.918$ us (or d=1175 m), and if d=500 m line of sight (LOS) and $T_{unc}$=391 ns, $\Delta t_{unc}\approx 2.25$ us.

As previously stated, aspects disclosed herein are directed towards a synchronization enhancement for OOC V2X communications. Particular aspects are directed towards maintaining a V2X communication when a GNSS synchronization signal, Serving cell/Pcell, or SyncRef UE reference timing is lost by a UE. Indeed, rather than suspending the V2X communication, it is contemplated that transmission timing can be maintained by utilizing timing information received from other UEs that remain synchronized. For instance, with reference to FIG. 9, an example is provided wherein a vehicle 710 that has lost the GNSS synchronization signal, can maintain a V2X communication by obtaining timing information via transmissions 742, 752, 762, and 772 respectively from any of a plurality of GNSS synchronized vehicles 740, 750, 760, and 770.

Figure 10:
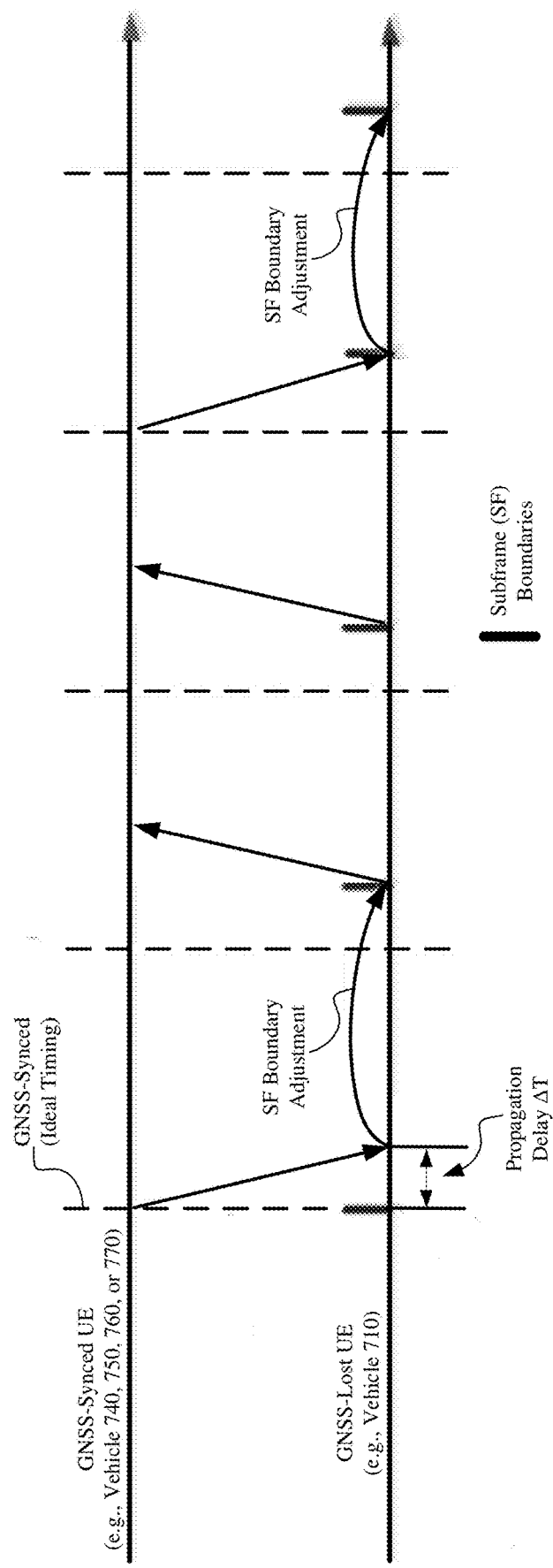
FIG. 10 is an exemplary timing diagram illustrating how a vehicle may be assisted by timing information provided by synchronized vehicles in accordance with aspects of the disclosure.

In a particular example, it may be assumed that a synchronization signal is lost when $F_{unc}$>0.1 ppm or $T_{unc}$>391 ns. Under these circumstances, whereas legacy-configured UEs will suspend C-V2X transmissions, aspects disclosed herein contemplate configurations for vehicle 710 in which C-V2X transmissions are maintained by utilizing the received packet timing transmitted from other synchronized UEs (e.g., synchronized vehicles 740, 750, 760, and 770). In FIG. 10, an exemplary timing diagram is provided illustrating how vehicle 710 may be assisted by timing information provided by any of synchronized vehicles 740, 750, 760, and/or 770. Namely, it is contemplated that vehicle 710 may estimate the packet arrival timing (e.g., where propagation delay $t_{pd}$ and $T_{unc}$ are included) and adjust its SF boundary by applying the estimated delay, $t^a$. If possible, it is further contemplated that vehicle 710 would only use trusted and synchronized packets for timing adjustments. For the example illustrated in FIG. 10, it is assumed that there is no timing drift between vehicle 710 and any of synchronized vehicles 740, 750, 760, and/or 770 (i.e., $F_{unc}$=0) and that there is no mobility. It is also assumed that SF boundary adjustment of vehicle 710 is aligned with any of synchronized vehicles 740, 750, 760, and/or 770 by a propagation delay offset $\Delta T$ and ±12 Ts.

Figure 11:
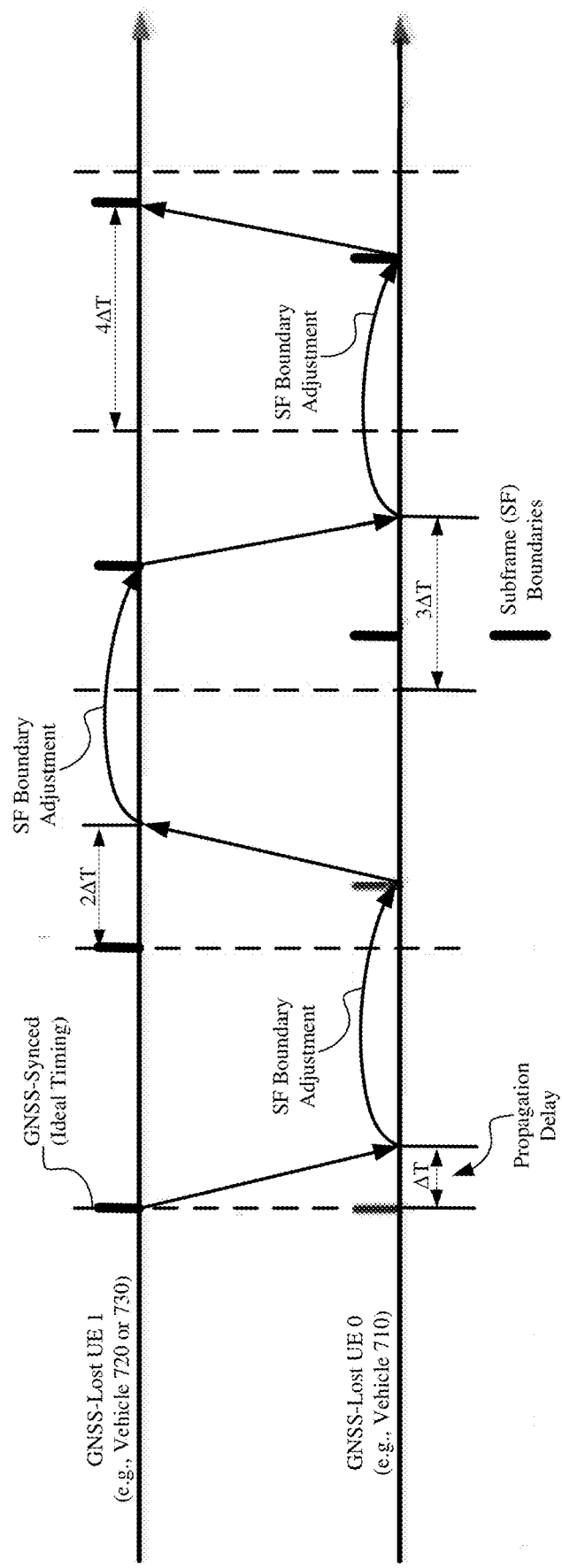
FIG. 11 is an exemplary timing diagram illustrating how two GNSS-lost UEs may assist each other in accordance with aspects of the disclosure.

In another aspect disclosed herein, it is contemplated that similar timing adjustments can be made between two GNSS-lost UEs, as illustrated in FIG. 11. Here, for example, vehicle 710 may be assisted by timing information received from GNSS-lost vehicles 720 and/or 730. As illustrated, however, the timing offset continues to increase relative to the ideal GNSS timing in a "ping-pong" pattern (e.g., from $\Delta T$ to $2\Delta T$ to $3\Delta T$ to $4\Delta T$ ...). To avoid this ping-pong pattern, it would thus be desirable to configure vehicle 710 so that the timing adjustments disclosed herein only utilize timing information received from GNSS-synchronized UEs (e.g., vehicles 740, 750, 760, and/or 770).

In yet another aspect, the vehicle 710 may be configured to compute a weight for timing information received from two or more of synchronized vehicles 740, 750, 760, and 770. Each weight may be based on any of various aspects corresponding to transmissions 742, 752, 762, and 772. For instance, the vehicle 710 may determine a weight based on whether a channel quality or other metric for a corresponding transmission 742, 752, 762, or 772 exceeds a threshold. Otherwise the vehicle 710 may discard or assign a weight of zero to timing data associated with the corresponding synchronized vehicle 740, 750, 760, or 770. In one aspect, the vehicle 710 computes a weight for timing information received from each of the synchronized vehicles 740, 750, 760, and 770. For example, the vehicle 710 may compute a first weight (W1) for timing information received from the first synchronized vehicle 740 based on aspects of transmission 742 Similarly, the vehicle 710 may compute: a second weight (W2) for timing information received from the second synchronized vehicle 750 based on aspects of transmission 752; a third weight (W3) for timing information received from the third synchronized vehicle 760 based on aspects of transmission 762; and a fourth weight (W4) for timing information received from the fourth synchronized vehicle 770 based on aspects of transmission 772.

To compute a weight for timing information received from a particular device, the vehicle 710 may be configured to compute sub-weights, wherein each sub-weight may be based on a different factor corresponding to the device. For example, W1 may be computed using W1=½*$(W_{time\_confidence}+W_{propagation\_delay})$ where $W_{time\_confidence}$ is a sub-weight based on a time confidence parameter corresponding to the first transmission 742 and $W_{propagation\_delay}$ is a sub-weight based on a propagation delay parameter corresponding to the first transmission 742. Other parameters and sub-weights may be used to compute W1 or sub-weights of W1, and similar principles may be applied to calculating weights W2, W3, and W4. Based on the weights W1, W2, W3, and W4 the vehicle 710 may compute a weighted time average, wherein its own timing is adjusted based on the weighted time average.

Factors used to compute sub-weights may include packet timing information, higher layer parameters, and/or other parameters discussed herein. A higher layer may refer to a layer above a layer at which the packet timing information is indicated. For example, the packet timing information may correspond to a physical layer (Layer 1) and/or a medium access control (MAC) layer (Layer 2). A higher layer parameter may include a parameter corresponding to a layer above the physical or MAC layer, such as an RRC, IP, PDCP, transmission control protocol (TCP), application layer, or other layer above the physical or MAC layer. The packet timing information may correspond to a first layer and the higher layer parameters may correspond to a second layer above the first layer in a protocol stack. For example, the first layer may include a MAC layer and the second layer may include an application layer. As another example, the first layer may include a physical layer and the second layer may include a MAC layer or higher layer. As another example, the first layer may include an RRC or MAC layer and the second layer may include layer at or above an IP layer or transport layer (e.g., a TCP layer or higher).

As noted above, the respective weights for timing information received from each of the synchronized vehicles 740, 750, 760, and 770 may be based on any of various aspects of corresponding transmissions 742, 752, 762, and 772. For example, packet timing information may include a time at which the packet is received, a time at which the packet is sent, and/or an indication of a synchronization state of the synchronized vehicle 740, 750, 760, or 770. The vehicle 710 may estimate a propagation delay for the received packet, wherein the propagation delay may be used to estimate a V2X timing adjustment for the vehicle 710. The vehicle 710 may also determine a value for a weight or a sub-weight for timing information received from a synchronized vehicle 740, 750, 760, or 770 based on the propagation delay. For example, a propagation delay below a first threshold may be assigned a first sub-weight value, whereas a propagation delay above the first threshold and below a second threshold may be assigned a second sub-weight value, and a propagation delay above the second threshold may be assigned a third sub-weight value. It is also contemplated that the vehicle 710 may multiply the propagation delay by a multiplication factor or perform another computation to calculate a sub-weight for a particular synchronized vehicle 740, 750, 760, or 770.

The weights for timing information received from each of the synchronized vehicles 740, 750, 760, and 770 may also be based on higher layer information of corresponding transmissions 742, 752, 762, and 772. In one aspect, the transmissions 742, 752, 762, and 772 may include standardized basic safety messages corresponding to a higher layer. For example, a V2X communication standard, such as a 3GPP or SAE standard, may require that V2X devices periodically send a basic safety message indicating a position or driving state of the V2X device. These basic safety messages may be used to allow nearby vehicles, or other V2X communication devices, to determine various details about a vehicle, such as its capabilities, current driving parameters, or other details. Some factors that may be included in a basic safety message, and which may be used for computing a weight for the corresponding vehicle, include a time confidence parameter and a positional accuracy parameter. Similar to other parameters, a sub-weight for timing information received from the synchronized vehicles 740, 750, 760, and 770 may be determined based on the value of a corresponding time confidence parameter. For example, the time confidence value may be a pass/fail value indicating whether the timing of the synchronized vehicle 740, 750, 760, or 770 is within a certain range of GNSS or other reference time. If the time confidence value indicates it is within this range, the vehicle 710 may assign a first sub-weight to the synchronized vehicle 740, 750, 760, or 770 based on the time confidence parameter, and if the time confidence value indicates it is not within this range, a different lower sub-weight may be assigned. The different lower sub-weight may be zero or non-zero, for example. Similarly, the vehicle 710 may determine a sub-weight based on a positional accuracy parameter which may be present in a higher layer basic safety message. The positional accuracy parameter may indicate an accuracy of a position parameter or position estimate for the synchronized vehicle 740, 750, 760, or 770. Based on the value of the positional accuracy parameter, the vehicle 710 may assign different values for sub-weights for the particular synchronized vehicle 740, 750, 760, or 770.

Other factors which the vehicle 710 may use to compute a weight or sub-weight for a particular synchronized vehicle 740, 750, 760, or 770 include a reference signal strength (RSSI) of the packets/signals received from the synchronized vehicle 740, 750, 760, or 770, a speed of the synchronized vehicle 740, 750, 760, or 770, a heading or direction of travel of the synchronized vehicle 740, 750, 760, or 770, an angle of arrival of the packet, a volume of traffic, and/or a length of continuous reception from the synchronized vehicle 740, 750, 760, or 770. A sub-weight based on RSSI may be increased with increased RSSI. A sub-weight based on a speed of the synchronized vehicle 740, 750, 760, or 770 may decrease with an increase in speed or may increase based on how similar a speed and heading of the synchronized vehicle 740, 750, 760, or 770 matches a speed and heading of the vehicle 710. For example, timing information received from synchronized vehicles 740 and 770, which are traveling in a similar direction as vehicle 710, may receive a higher sub-weight based on speed and/or heading when compared to synchronized vehicles 750 and 760. A sub-weight based on an angle of arrival of a packet may increase when the angle of arrival is closer to a forward or rear direction of the vehicle 710 (e.g., parallel to an axis of the parent vehicle) and decrease when the angle of arrival is closer to a left or right side direction of the vehicle 710 (e.g., perpendicular to the axis of the parent vehicle). A sub-weight based on the volume of traffic may be based on the number of successful messages received from that particular synchronized vehicle 740, 750, 760, or 770. For example, the number of successful messages may be a number received consecutively, a number received within a defined time period, or the like. For example, the greater the volume of traffic from the particular synchronized vehicle 740, 750, 760, or 770 (i.e., an increased number of successfully received messages) the higher the sub-weight value may be. A sub-weight based on the length of continuous reception may increase based on an increased length of continuous reception because, in one aspect, receiving consistent timing from the same synchronized vehicle 740, 750, 760, or 770 for a long time may make that device more reliable. Other parameters or factors may also be used to compute the weights or sub-weights for different devices. In one embodiment, a sub-weight may be computed for each factor.

In a particular example, Equation 1 below may be used to compute a weight for a timing for each of the synchronized vehicles 740, 750, 760, and 770:

$$W_x = \frac{1}{n} \times \sum_{1}^{n} w_n$$

Here, $W_x$ is the final weight to be applied to the timing derived from a particular synchronized vehicle 740, 750, 760, or 770, n is the number of sub-factors used to calculate the final weight for a particular synchronized vehicle 740, 750, 760, or 770, and $w_n$ is a sub-weight for a particular factor, such as a time confidence, RSSI, speed, heading, angle of arrival, volume of traffic, and/or a length of continuous reception factor. By way of example, if a weight is based on a time confidence parameter and a propagation delay W1 for synchronized vehicle 740 may be calculated as $\frac{1}{2} * (W_{time\_confidence} + W_{propagation\_delay})$. Further to the example, if the value of the time confidence parameter for synchronized vehicle 740 is >1 us, $W_{time\_confidence} = 0.8$ (otherwise $W_{time\_confidence} = 0.3$). Further to the example, if the value of the propagation delay parameter for synchronized vehicle 740 is <3 us, $W_{propagation\_delay} = 0.9$ (otherwise $W_{propagation\_delay} = 0.2$).

Using Equation 1 above, final weights W1, W2, W3, and W4 respectively corresponding to timing information received from synchronized vehicles 740, 750, 760, and 770 may be computed by the vehicle 710. For example, the vehicle 710 may compute a V2X timing adjustment based on Equation 2 below:

$$T_{V2X} = \frac{\sum_{1}^{x} W_x T_x}{\sum_{1}^{x} W_x}$$

Here, $W_x$ is the final weight for a corresponding device, which may be computed using Equation 1 above. The value x is the number of synchronized vehicles 740, 750, 760, and/or 770 on which V2X timing adjustments will be based for the vehicle 710. $T_x$ is the V2X timing adjustment for the particular synchronized vehicle 740, 750, 760, or 770 determined by the vehicle 710 based on the timing information received via a corresponding transmission 742, 752, 762, or 772. For example, $T_1$ may be the estimated V2X timing or timing adjustment determined based on the transmission(s) 742 received from synchronized vehicle 740. Similar timing adjustments or timing values are computed by the vehicle 710 for other devices, such timing adjustments or timing values corresponding to synchronized vehicles 750, 760, and/or 770. $T_{V2X}$ is the V2X timing update or timing adjustment used by the vehicle 710 to determine timing for V2X communications.

According to one exemplary scenario, upon detecting that the signal received from the GNSS 700 is beginning to fade, it is contemplated that the vehicle 710 may enter a receive only period to receive transmissions 742, 752, 762, and 772 from respective synchronized vehicles 740, 750, 760, and 770, which facilitates maintaining synchronization with the GNSS 700. The vehicle 710 may stop transmission of one or more types of V2X signals to avoid causing interference with other V2X communications. The vehicle 710 may compute a timing update or timing adjustment (e.g. $T_x$ in Equation 2) for each of the respective synchronized vehicles 740, 750, 760, and 770 and may also compute a final weight (e.g., $W_n$ in Equation 1) for each of the respective synchronized vehicles 740, 750, 760, and 770. In the example scenario, weights W1 and W2 for timing information received from synchronized vehicles 750 and 760, respectively, may be discarded due to opposite headings and/or other factors. Weights W3 and W4 for timing information received from synchronized vehicles 740 and 770, respectively, may be computed as higher or non-zero since they have similar headings and/or speeds than vehicle 710. In an example scenario, timing information received from synchronized vehicle 740 has a high time confidence, high positional accuracy, and a low propagation delay while timing information received from synchronized vehicle 770 has a lower time confidence, lower positional accuracy, and a higher propagation delay, which may be detected by the vehicle 710 based on received packets and/or higher layers. Using Equation 2, the vehicle 710 may compute a V2X timing update or timing adjustment to update its own V2X timing. Because the timing information received from synchronized vehicle 770 has a higher final weight, the vehicle 710 may use a timing update or timing adjustment closer to the timing value corresponding to synchronized vehicle 770 than the timing value corresponding to synchronized vehicle 740. The vehicle 710 proceeds with V2X communications (transmission and/or receptions) based on the updated V2X timing to allow the vehicle 710, or parent vehicle, to maintain driving or other operations.

Figure 12:
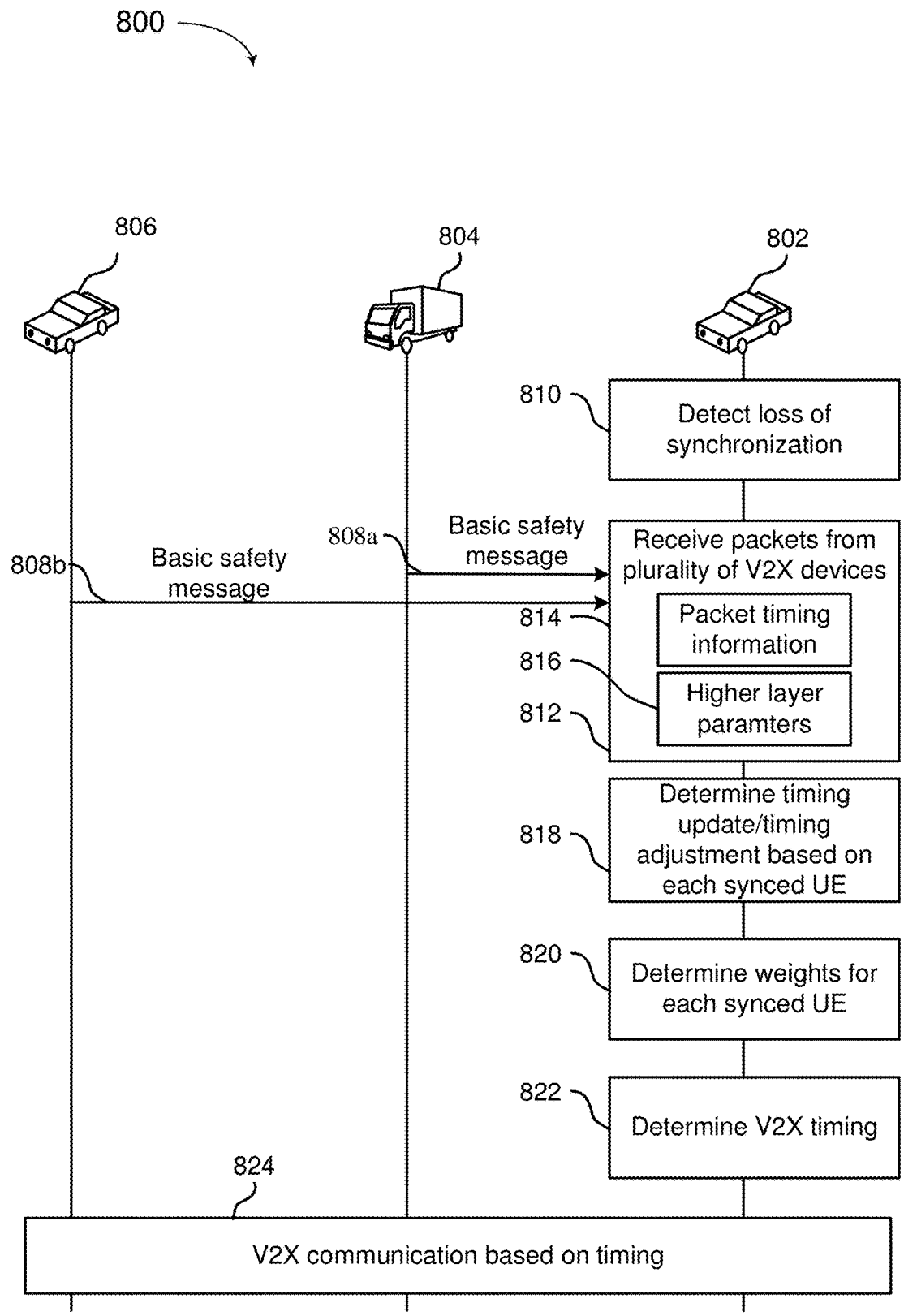
FIG. 12 is a graphical diagram illustrating an exemplary method for out-of-coverage V2X communications in accordance with certain aspects of the disclosure.

FIG. 12 is a graphical diagram 800 illustrating a method for out-of-coverage V2X time derivation, according to one implementation. The method may involve communications between a UE 802 and one or more synchronized UEs including a first synchronized UE 804 and a second synchronized UE 806. It should be appreciated that the UE 802 and the synchronized UEs 804 and 806, are substantially similar to any of the UEs/scheduled entities discussed herein and/or included in the FIGs.

At 810, the UE 802 detects a loss of synchronization with a synchronization source on which D2D or V2X communication timing is based. For example, the UE 802 may detect that it has lost synchronization with a GNSS 700. The synchronization source may be a device or system that transmits synchronization signals which allow for a common timing reference for V2X communication, such as a GNSS system, a base station or serving cell, or other system. The UE 802 may detect the loss of synchronization at 810 based on a timing uncertainty value or error value being greater than a threshold value. A loss of synchronization at 810 may occur, for example, when the vehicle 710 enters a geographical region where a satellite synchronization signal is not adequately received or detected. The UE 802 may detect the loss of synchronization by detecting that a synchronization signal has not been received for a threshold time, by calculating a timing drift, or the like. The vehicle 710 may calculate a timing uncertainty value or an error value for its V2X timing and may detect the loss of synchronization if one of these exceeds a threshold.

As discussed previously, loss of synchronization at 810 may result in reduced ability to send and receive V2X communications. Since these communications may require synchronization for safety of vehicles, passengers, pedestrians, and others, an operating vehicle may be required to pull to a side of a road or hand over control to a human operator. However, according to some aspects herein the UE 802 may be able to maintain sufficient synchronization based on packet transmissions from synchronized UEs 804 and 806. Upon detection of the loss of the synchronization at 810, the UE 802 may trigger a receive-only period where it does not transmit V2X communications but listens for V2X communications from other vehicles. During or after this receive-only period the UE 802 may be able to obtain sufficient timing accuracy to allow the UE 802 to continue or resume V2X communications, including both transmissions and receptions. In some aspects, a receive-only period may not be used if sufficiently accurate V2X timing is maintained above a threshold.

At 812, the UE 802 receives packets from a plurality of V2X devices. The packets received at 812 may including a first basic safety message 808a from the first synchronized UE 804 and a second basic safety message 808b from the second synchronized UE 806. The packets may include V2X communications and may include information about packet timing in a header or other location of the packet. Receiving the packets at 812 may include receiving the transmissions 742, 752, 762, and 772 shown in and discussed in relation to FIG. 9. At 814, the receiving of packets at 812 may include receiving packet timing information from a plurality of synchronized devices. The packet timing information may include timing information for the transmission of a packet, such as a transmission time of the packet, a synchronization source of the packet, or the like. Packets, such as those carrying a basic safety message, may include the timing of the corresponding parent peer UE (e.g., synchronized UE 804 or 806) at the time of transmission and may indicate that the parent peer UE is synchronized with a GNSS, wide area network, or the like. The UE 802 may also be able to derive other packet timing information such as an RSSI of the packet, a subframe (SF) boundary, an angle or arrival of the packet, and/or a length of continuous reception of packets from the peer UE.

At 816, the receiving of packets at 812 may include receiving higher layer parameters. The receiving of packets at 812 may also include receiving packets that include messages or parameters corresponding to a higher layer, such as basic safety messages 808. One or more of these higher layer parameters may be used by the UE 802 to estimate a timing for the transmission of a corresponding packet and/or to determine how accurate that estimate or timing is. For example, if the packets received at 812 include a basic safety message 808, the higher layer parameters may include a time confidence parameter, a positional accuracy parameter, an indication of the heading or speed of the UE from which the packet was transmitted, or any of the other parameters discussed herein. The higher layer parameters may be carried in the same packets/messages that include packet timing information or that are used to derive packet timing information.

At 818, the UE 802 determines a timing update or timing adjustment based on each synchronized UE. The UE 802 may determine a timing update or timing adjustment based on each synchronized UE 804 and 806 without applying the timing update or timing adjustment to its own timing. For example, if the UE 802 receives packets from two other synchronized UEs, the UE 802 may determine two different timing updates or timing adjustments based on each respective peer UE. The UE 802 may determine a timing update or timing adjustment for each synchronized UE by ascertaining a packet arrival time estimate associated with the packet, a propagation delay estimate, a downlink timing drift estimation, or the like. The UE 802 may determine the timing update or timing adjustment by compensating for a propagation delay estimate, based on a downlink timing drift estimation, by limiting an amount of the timing adjustment based on the timing uncertainty value or the error value, based on an estimated SF boundary, and/or based on a packet arrival time estimate. Each timing adjustment or timing update may be stored/maintained while weights are computed for each peer UE. In some aspects, the UE 802 may discard the timing information from a specific synchronized UE if it appears to be outside a threshold accuracy and may not use the corresponding timing update/timing adjustment to adjust or compute its own timing.

At 820, the UE 802 determines weights for each synchronized UE from whom packets have been received and/or for whom a timing update or timing adjustment has been determined. The weights may correspond to a priority or trust factor for the corresponding timing update or timing adjustment associated with a specific synchronized UE. By accounting for various factors associated with the packet, synchronized UE, or higher layers, the UE 802 can compute weighting factors that can be used so that better timing estimates have a greater impact on a resulting timing to be used by the UE 802 for V2X timing.

The UE 802 may determine weights for the plurality of synchronized devices based on the timing parameter values for the higher layer parameters 816, the weights including a first weight for the first synchronized UE 804 and a second weight for the second synchronized UE 806. Determining the first weight may include identifying a plurality of weight factors including at least a first weight factor and a second weight factor for the first synchronized UE 804. These weight factors may include one or more of a signal strength corresponding to a packet of the plurality of packets (e.g., RSSI), a speed of the first synchronized UE 804, a heading of the first synchronized UE 804, an angle of arrival of one or more packets from the first synchronized UE 804, a length of continuous reception of packets from a the first synchronized UE 804, or a combination thereof. The determining of the weights for each synchronized UE at 820 may include determining a sub-weight for each weighting factor and generating a final weight (e.g., the first weight for the first synchronized UE 804 and the second weight for the second synchronized UE 806) based on the sub-weights. In one embodiment, each sub-weight may be determined or computed by looking up a threshold or multiplier in a look-up table to determine the sub-weight corresponding to the specific weight factor. In one aspect, each final weight for a synchronized UE may be calculated as discussed in relation to Equation 1 above.

At 822, the UE 802 determines a V2X timing based on the timing updates or timing adjustments and weights for the synchronized UEs 804 and 806. In one aspect, the UE 802 determines the V2X timing based on the timing updates or timing adjustments computed for a plurality of different synchronized UEs as well as the corresponding weights for the synchronized UEs. In one embodiment, the UE 802 determines a weighted time average of the timing updates or timing adjustments using the weights determined at 820 and the timing updates or timing adjustment for the different synchronized UEs 804 and 806 at 818. For example, when generating the weighted time average the UE 802 uses a first weight for the first synchronized UE 804 that may be different than a second weight for the second synchronized UE 806. Because, in one aspect, the weights and/or timing updates or timing adjustments are based on the packet timing information and timing parameter values from the higher layer, the V2X timing determined at 822 is based both on packet timing information and the upper layer timing parameter values. The determining the V2X timing may include setting or modifying an internal V2X timing for the UE 802 based on the determined V2X timing.

In one aspect, receiving packets at 812, determining the timing update or timing adjustments at 818, determining weights at 820, and/or determining V2X timing at 822 may be performed during a receive-only period where the UE 802 is not transmitting V2X communications but only receiving them. After determining the V2X timing at 822, the UE 802 may, at 824, exit the receive only period with a sufficiently accurate V2X timing to both transmit and receive V2X communications. In another aspect, the UE 802 may continue to transmit V2X communications during steps 812, 818, 820, and 822 if its V2X timing remains a threshold level of accuracy.

At 824, the UE 802 performs a communication based on the V2X timing determined at 822. Performing the communication at 824 may include communicating directly with one or more synchronized devices (such as the first synchronized UE 804, second synchronized UE 806, or other UE or V2X device).

Figure 13:
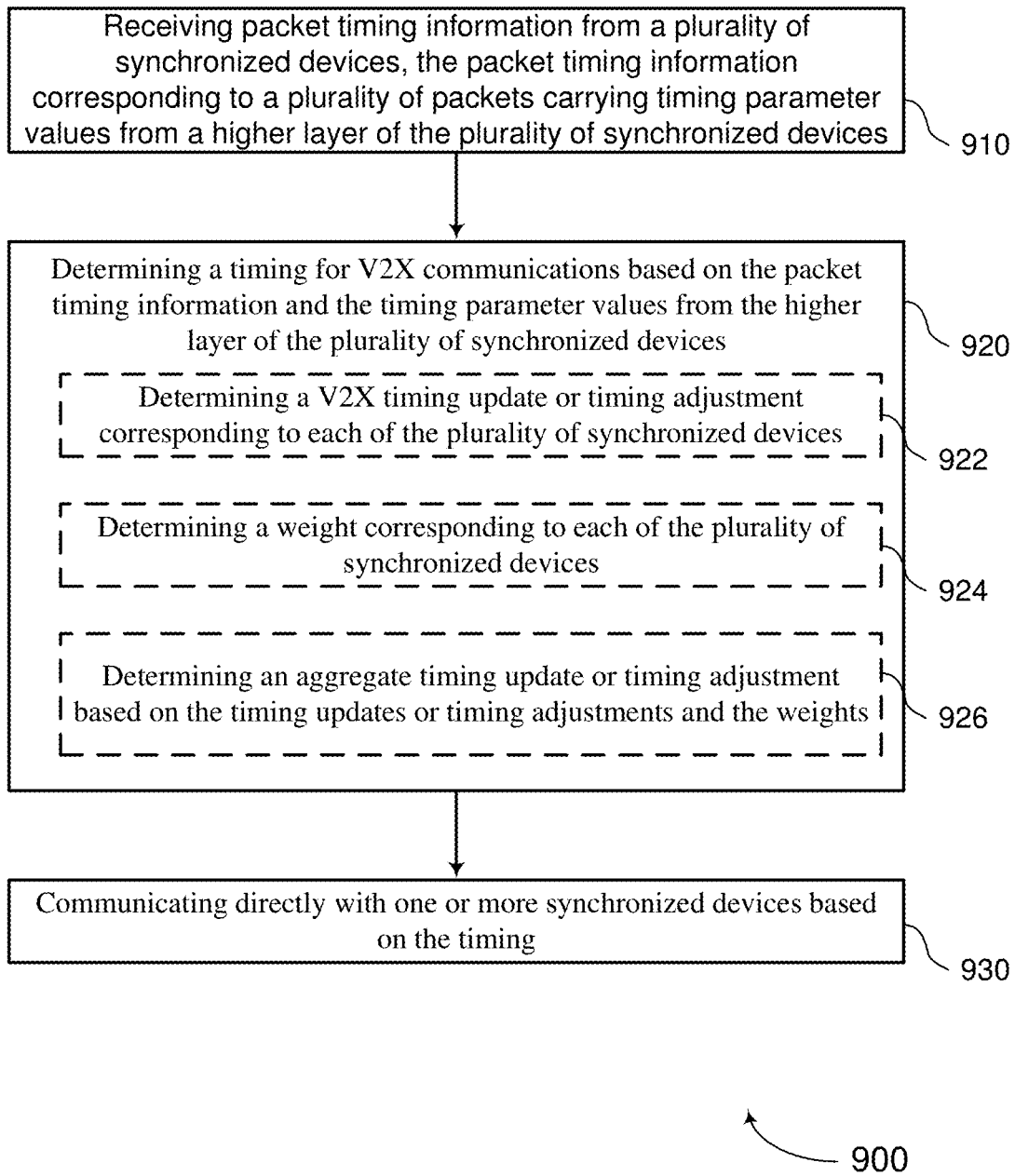
FIG. 13 is a flowchart illustrating an exemplary process that facilitates performing weighted timing adjustment in accordance with aspects disclosed herein.

Referring next to FIG. 13 a flowchart is provided of a method 900 for out-of-coverage peer-to-peer timing, in accordance with certain aspects of the disclosure. This method 900 may be performed by any of the UEs/scheduled entities discussed herein and/or included in the FIGs. Aspects in broken lines may be optionally present or combined within various implementations of the method 900.

In the method 900, the device (e.g., vehicle 710, UE 802, etc.) receives packet timing information from a plurality of synchronized devices at act 910. The packet timing information may correspond to a plurality of packets carrying timing parameter values from a higher layer of the plurality of synchronized devices. The device may further determine packet timing information based on the packets it receives, such as by determining an angle of arrival, RSSI, an estimated arrival time, or the like.

At act 920, the device then determines a timing for V2X communications based on the packet timing information and the timing parameter values from the higher layer of the plurality of synchronized devices. The determining of the timing for V2X communications may include determining an internal timing of the device. In one aspect, the determining of the timing for V2X communications may include determining a V2X timing update or timing adjustment corresponding to each of the plurality of synchronized devices at act 922. For example, the device may determine an estimated propagation delay, timing drift, synchronization state of the synchronized device, or other information and calculate a timing update or timing adjustment which could be used for its own V2X timing.

In one aspect, the determining performed at act 920 may include act 924 where the device determines a weight corresponding to each of the plurality of synchronized devices. The weight determined at act 924 may be based on the packet timing information and/or the timing parameter values from the higher layer. The device may calculate a weight for a specific synchronized device based on any of a plurality of weight factors. The plurality of weight factors may include on one or more of a time confidence, a positional accuracy, a parameter of a basic safety message, a signal strength corresponding to a packet of the plurality of packets, a speed of the synchronized device, a heading of the synchronized device, an angle of arrival of a packet from the synchronized device, an amount of wireless traffic from synchronized devices, and/or a length of continuous reception from a synchronized device. A sub-weight may also be determined for each weight factor and a weight for a specific synchronized device may be computed based on the sub-weights.

In one aspect, the determining performed at act 920 may include act 926 where the device determines an aggregate timing update or aggregate timing adjustment based on the timing updates or timing adjustments determined at act 922 and the weights determined at act 924. This may result in an aggregate timing update or aggregate timing adjustment that can be used to update the device's timing. Because the timing is based on a plurality of different device timings, the accuracy of the timing with respect to a reference GNSS or other reference timing may be probabilistically improved. At act 926, the device may determine the aggregate timing update or aggregate timing adjustment by generating a weighted time average based on signals received from the plurality of synchronized devices. The weighted time average may include a first weight for a first device of the plurality of synchronized devices that is different than a second weight for a second device of the plurality of synchronized devices. In one aspect, the device determines the timing for V2X communications based on the aggregate timing update or aggregate timing adjustment determined at act 926.

At act 930, the device communicates directly with one or more synchronized devices based on the timing determined at 920. The device may communicate by transmitted and/or receiving V2X communications based on the timing determined at 920. The timing may include V2V, V2I, or other type of V2X communication.

Figure 14:
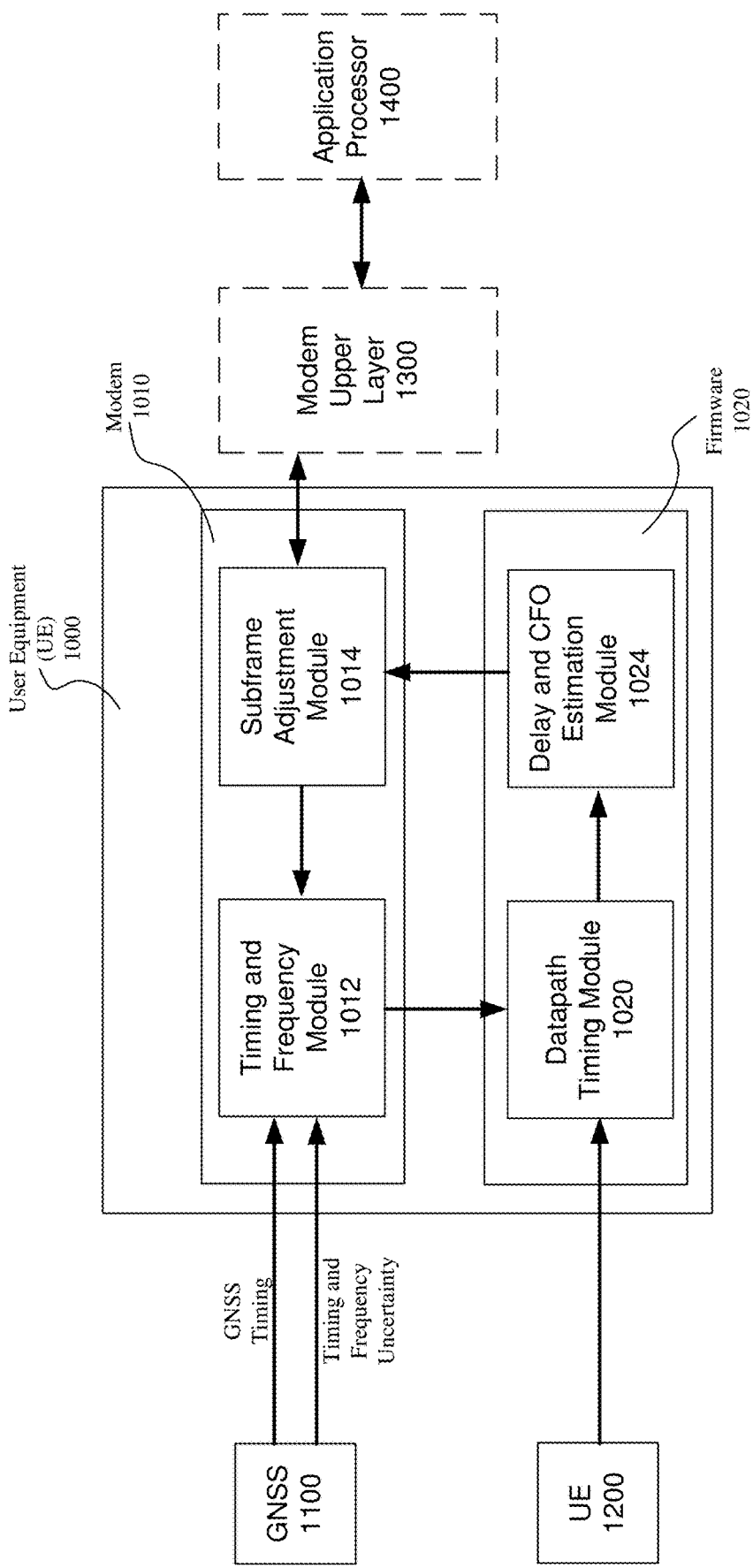
FIG. 14 is a block diagram of an exemplary UE configured in accordance with aspects disclosed herein.

Referring next to FIG. 14, a block diagram of an exemplary UE configured in accordance with aspects disclosed herein is provided. As illustrated, it is contemplated that UE 1000 may include a modem 1010 and firmware 1020, wherein the modem 1010 may include a timing and frequency module 1012 and a subframe adjustment module 1014, and wherein the firmware 1020 may include a datapath timing module 1022 and a delay and carrier frequency offset (CFO) estimation module 1024. For this example, the timing and frequency module 1012 may be configured to receive information from a GNSS 1100 including, for example, GNSS timing information (while synced) as well as realistic and reliable timing ($T_{unc}$) and frequency uncertainty ($F_{unc}$) to the modem 1010 after a synch loss. As illustrated, it is also contemplated that the datapath timing module 1022 may be configured to received timing information from a synchronized UE 1200, wherein the delay and CFO estimation module 1024 may then be configured to calculate the delay estimation and CFO for every subframe. The subframe adjustment module 1014 may then be configured to adjust SF boundaries based on a statistical metric of packet delay estimates with trusted packets, sync time confidence, positional accuracy, and propagation delay of over-the-air (OTA) <system frame number (SFN), subframe (SF)> (or <direct frame number (DFN), SF> for V2X) from the modem upper layer 1300. The timing and frequency module 1012 may then be configured to apply the timing adjustments for both transmit and receive SF boundaries to the firmware 1020. For some embodiments, it is also contemplated that an application processor 1400 may provide trusted <SRC L2 address>, sync time confidence, positional accuracy, and propagation delay to the modem 1010.

Figure 15:
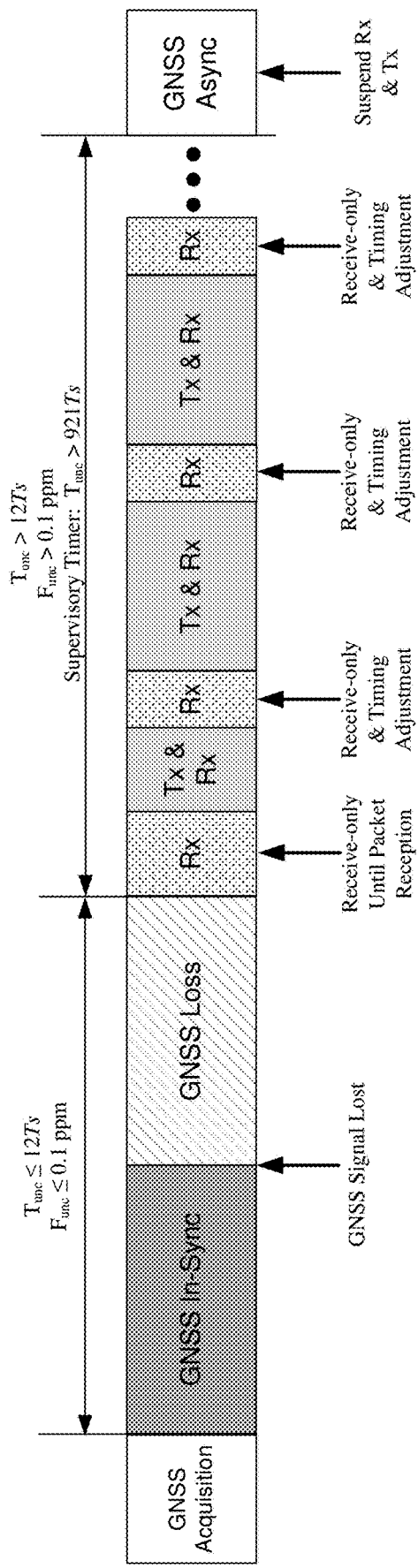
FIG. 15 is a timing diagram of an exemplary UE configured in accordance with aspects disclosed herein.

Referring next to FIG. 15, a timing diagram of an exemplary UE configured in accordance with aspects disclosed herein is provided. As illustrated, it is contemplated that when a synchronization signal is lost (e.g., when $T_{unc}$>12 Ts or $F_{unc}$>0.1 ppm), a UE may be configured to operate in a "receive-only" mode until a packet is detected. The UE may then maintain C-V2X transmission timing by utilizing the timing of the packets transmitted from other synced UEs during the periodic "receive-only" periods.

It is contemplated that a UE may be configured to perform timing adjustments at various times. For example, a UE may be configured to perform a timing adjustment may every 100 ms during the receive-only period. Alternatively, timing adjustments may occur outside of the receive-only period (e.g., based on the $F_{unc}$ and the elapsed time from the last timing adjustment). Also, if no timing adjustment is performed, the UE may be configured to stop transmitting until the next receive-only period.

Figure 16:
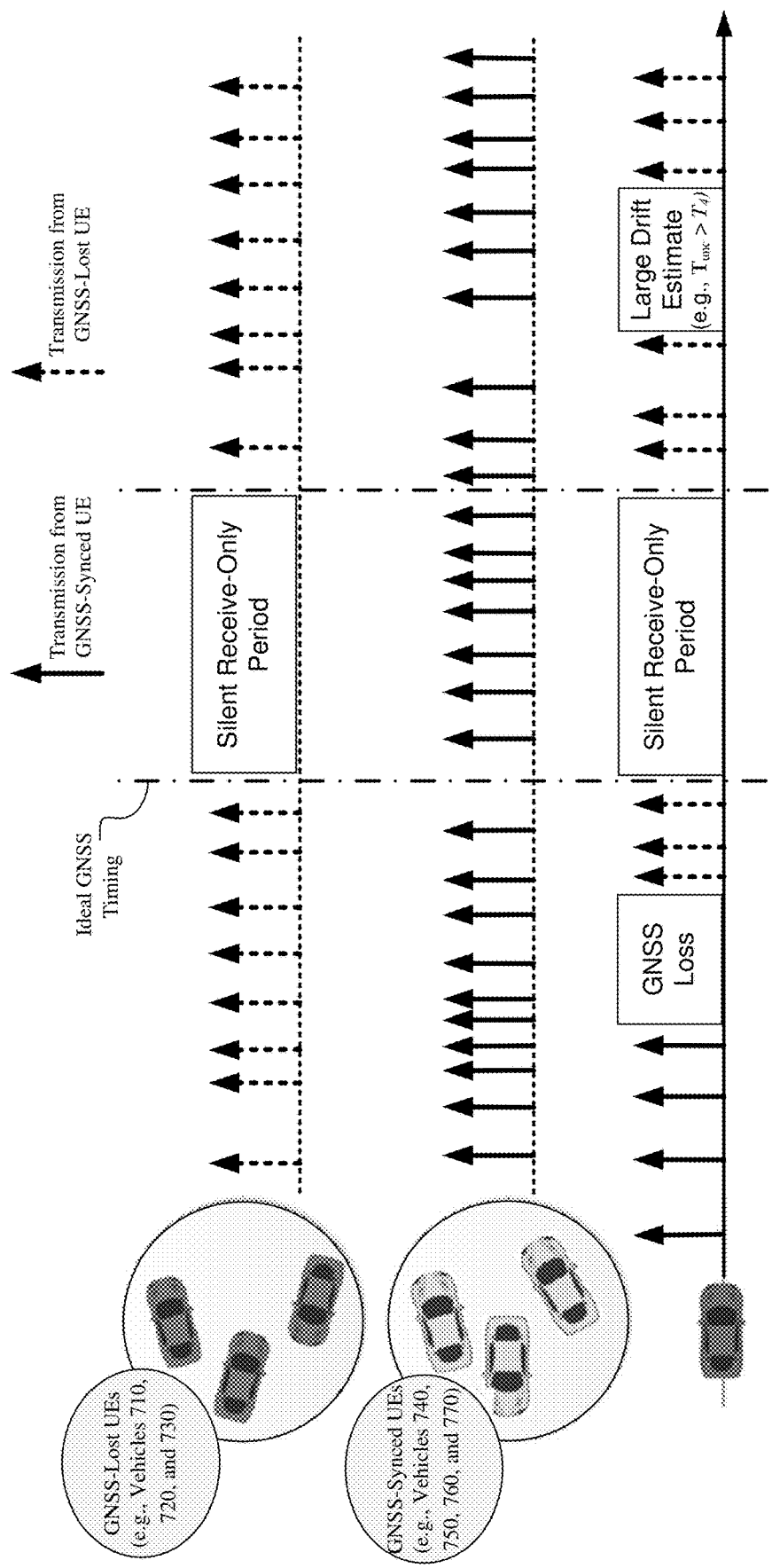
FIG. 16 is a timing diagram of an exemplary UE relative to synced and unsynced UEs in accordance with aspects disclosed herein.

Referring next to FIG. 16, a timing diagram of an exemplary UE relative to synced and unsynced UEs is provided in accordance with aspects disclosed herein. As illustrated, it is contemplated that a UE may operate in a receive-only mode upon detecting that a synchronization signal has been lost, wherein subframe timing adjustments may be performed during such receive-only periods (e.g., between SF 10239 and SF 1000), and wherein only synced UEs may be configured to transmit during the receive-only periods of the unsynced UEs. It is thus contemplated that unsynced UEs may perform timing adjustments during receive-only periods based on transmissions from synced UEs. Here, it should be appreciated that the actual timing adjustment window may be every SF [0~999] (+1 ms margin), and if no timing adjustment occurs an unsynced UE may cease transmissions until the subsequent receive-only period. Under some circumstances, it should also be appreciated that a timing adjustment may occur outside of a receive-only period including, for example, when the drift estimate is large (e.g., when $F_{unc} \times T_{Elapsed\text{-}Time\text{-}from\text{-}Last\text{-}Adjustment}$>$T_4$, wherein $T_4$ is an implementation-specific threshold such as 4 us).

Figure 17:
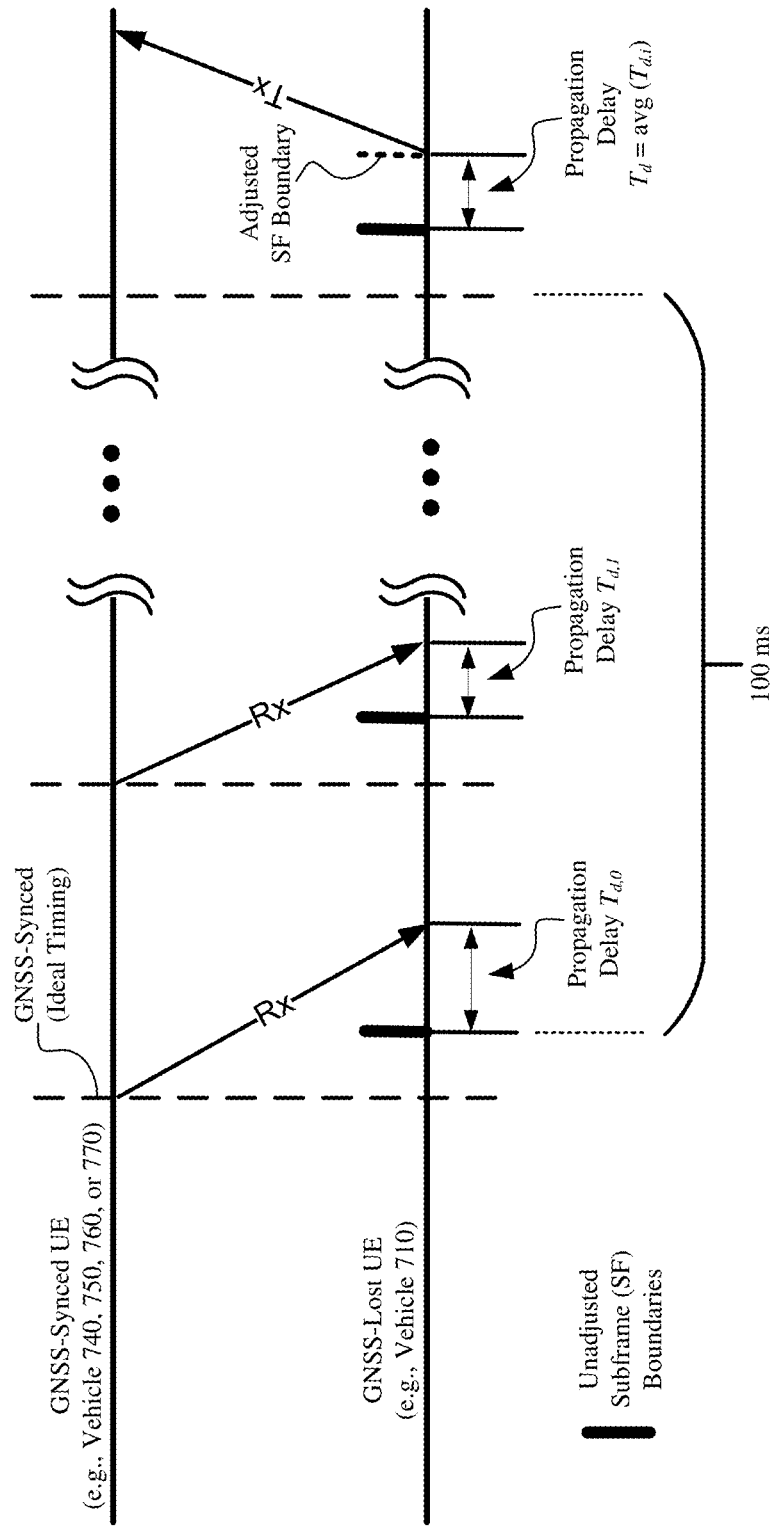
FIG. 17 is a timing diagram of an exemplary UE configured to adjust subframe boundaries based on a delay estimation in accordance with aspects disclosed herein.

Referring next to FIG. 17, a timing diagram of an exemplary UE configured to adjust SF boundaries based on a delay estimation in accordance with aspects disclosed herein is provided. As illustrated, upon detecting that a synchronization signal has been lost, it is contemplated that a UE may be configured to adjust its local SF boundary (both receive and transmit) based on a delay estimates of received packets.

Delay estimates may be based on cyclic redundancy check (CRC) passed PSSCH or PSCCH, for example, wherein timing adjustments may be bounded by +/−$T_{unc}$. As illustrated, it is further contemplated that a UE may be configured to perform timing adjustments during specific windows (e.g., every SF [0~999], every 100 ms) either within a receive-only period, or outside of the receive-only period when $T_{unc}$>$T_4$. It should also be appreciated that timing adjustments may use an averaged minimum of delay estimates (e.g., per subframe over 100 ms).

Figure 18:
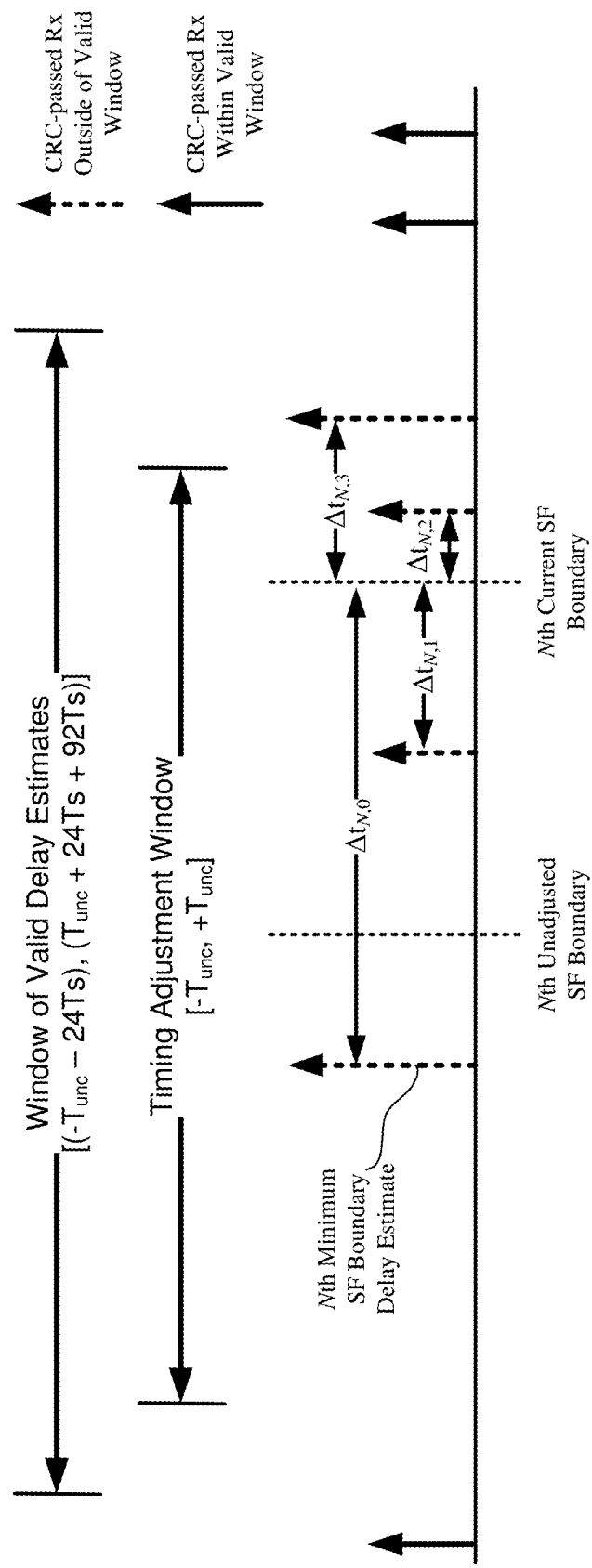
FIG. 18 is a first exemplary UE timing diagram illustrating how a timing adjustment may be bounded in accordance with aspects disclosed herein.
Figure 19:
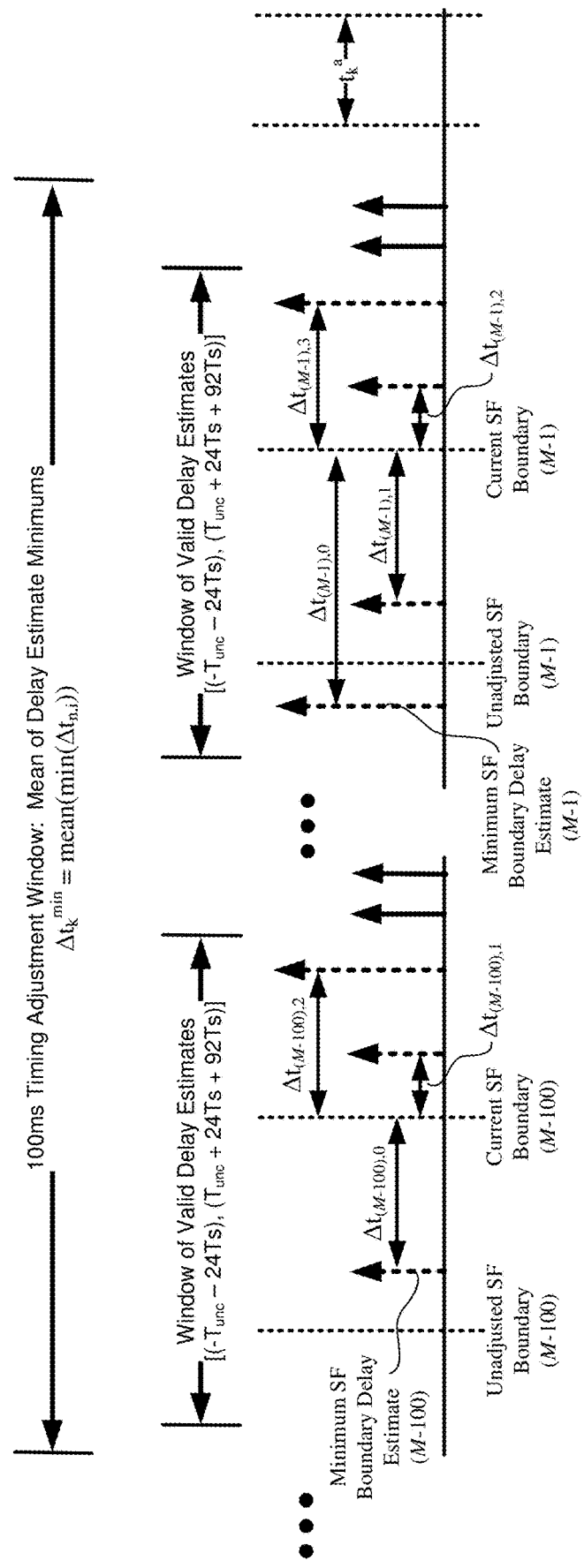
FIG. 19 is a second exemplary UE timing diagram illustrating how a timing adjustment may be bounded in accordance with aspects disclosed herein.

Referring next to FIGS. 18-19, exemplary UE timing diagrams are provided illustrating how a timing adjustment may be bounded in accordance with aspects disclosed herein. As illustrated, it is contemplated that timing adjustments may be bounded by +/−$T_{unc}$. For instance, in a particular example, the valid candidates of $i^{th}$ delay estimates of SF N, $\Delta t_{N,i}$, may be bounded by $$\Delta t_{N,i} + T_{total}{}^{\alpha} \in \{t | -T_{unc} - 24T_s \leq t \leq T_{unc} + 24T_s + T_{pd} \ (3 \ us)\}$$

where $T_{total}{}^{\alpha}$ is the total summation of previous timing adjustments, i.e., $\Sigma_k t_k{}^{\alpha}$, where $t_k{}^{\alpha}$ is the $k^{th}$ adjustment. Here, the $k^{th}$ temporary timing adjustment, $\tilde{t}_k{}^{\alpha}$, may be estimated based on the averaged minimum of delay estimates (e.g., $\tilde{t}_k{}^{\alpha}$=mean({min $\Delta t_{n,i}$}) over the 100 ms window). The $k^{th}$ timing adjustment $t_k{}^{\alpha}$ may thus be bounded by:

$$|\tilde{t}_k{}^{\alpha}| < T_{unc} \text{ and } |\tilde{t}_k{}^{\alpha}| < T_{unc}{}^{\alpha} = F_{unc} \times T_{Elapsed\text{-}Time\text{-}from\text{-}Last\text{-}Adjustment}$$

and $$|T_{total}{}^{\alpha} = \Sigma_{i=0}^{k-1} t_{k-1}{}^{\alpha} + \tilde{t}_k{}^{\alpha}| < T_{unc}$$

In another aspect of the disclosure, if timing adjustments are bounded by +/−$T_{unc}$, and SF boundaries are updated every 100 ms during the receive-only period:

$$t_M{}^{SF} = t_M{}^{SF} + t_k{}^{adj}$$

where $t_M{}^{SF}$ is the SF boundary of SF #M, as illustrated in FIG. 19, and where:

$$\text{Convergence} \approx \overline{T}_{pd}\left(=\frac{d}{c}\right) + F_{unc} \times t_{elapsed\text{-}time} + \eta_{estimation\text{-}error}$$

Figure 20:
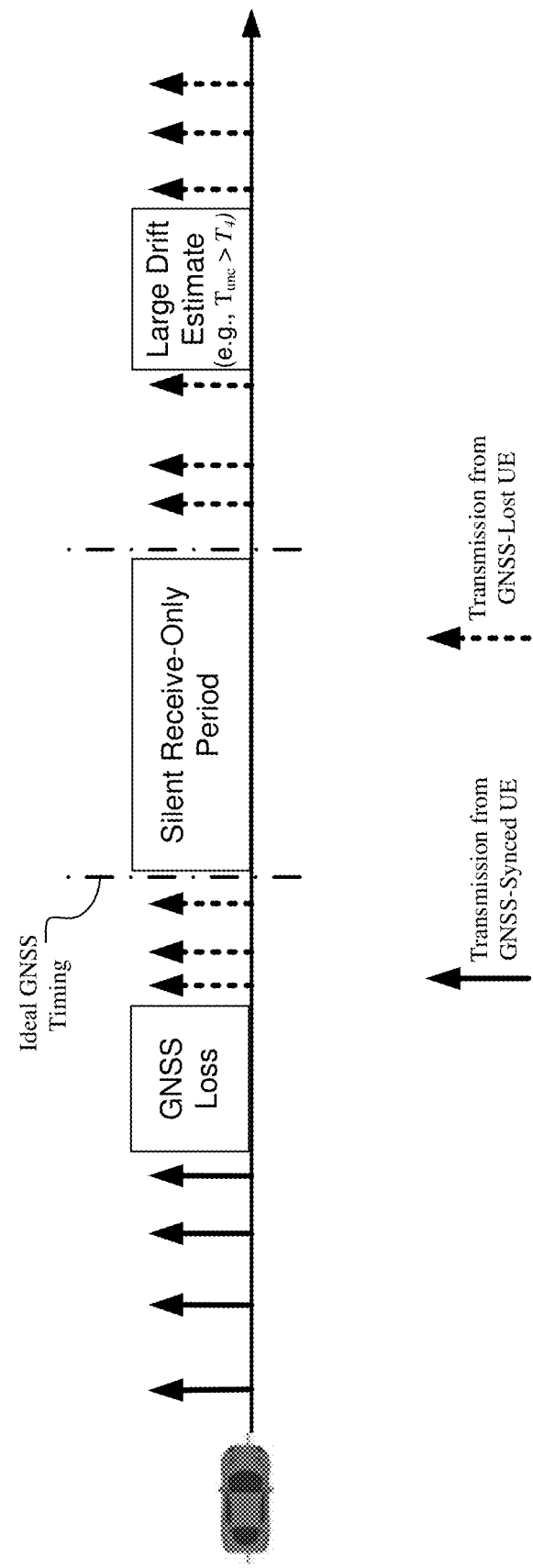
FIG. 20 is an exemplary UE timing diagram illustrating how a timing adjustment may be performed outside of a receive-only period in accordance with aspects disclosed herein.

Referring next to FIG. 20, an exemplary UE timing diagram is provided illustrating how a timing adjustment may be performed outside of a receive-only period in accordance with aspects disclosed herein. Here, it should again be appreciated that, if no timing adjustment occurs during a receive-only period, the UE may be configured to stop transmitting until the next receive-only period. The UE may then be further configured to perform timing adjustments outside of the receive-only period only under particular circumstances (e.g., when the drift estimate exceeds a predetermined threshold).

In another aspect of the disclosure, it is contemplated that timing adjustments may be based on information received from trusted UEs. Namely, it is contemplated that a UE may be configured to only use verified or trusted delay estimations when performing a timing adjustment. For example, a UE may be configured to enable this feature only when the UE is OOC from the synchronization signal and operating in a UE-assisted timing adjustment mode.

Figure 21:
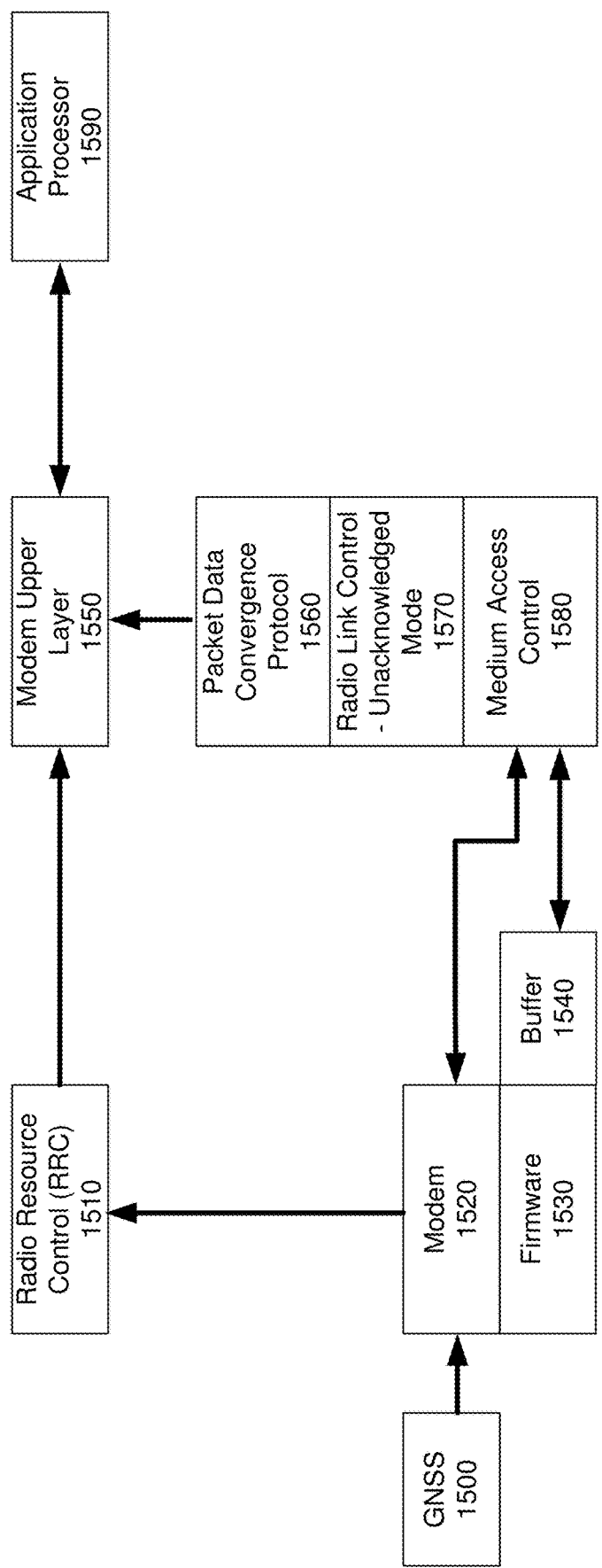
FIG. 21 is a block diagram of an exemplary UE configured to perform timing adjustments based on trusted UEs in accordance with aspects disclosed herein.

Referring next to FIG. 21, a block diagram of an exemplary UE configured to perform timing adjustments based on trusted UEs in accordance with aspects disclosed herein is provided. As illustrated, it is contemplated that the modem 1520 may provide OTA <SF, SFN> (or <DFN, SF> for V2X) to modem upper layer 1550 for every packet, and that the modem 1520 may be further configured to cache the <SFN, SF> and <SRC L2 address> of each packet. Upon finding rogue UEs and/or packets, the application processor 1590 may then be configured to provide the corresponding <SRC L2 addr> or <SFN, SF> to the modem 1520. The modem 1520 may be configured to detect <SFN, SF>s associated with rogue <SRC L2 addr>s, and report them to a lower layer, wherein the modem 1520 may exclude delay estimates of malicious <SF, SFN>s from the timing adjustment calculation.

Figure 22:
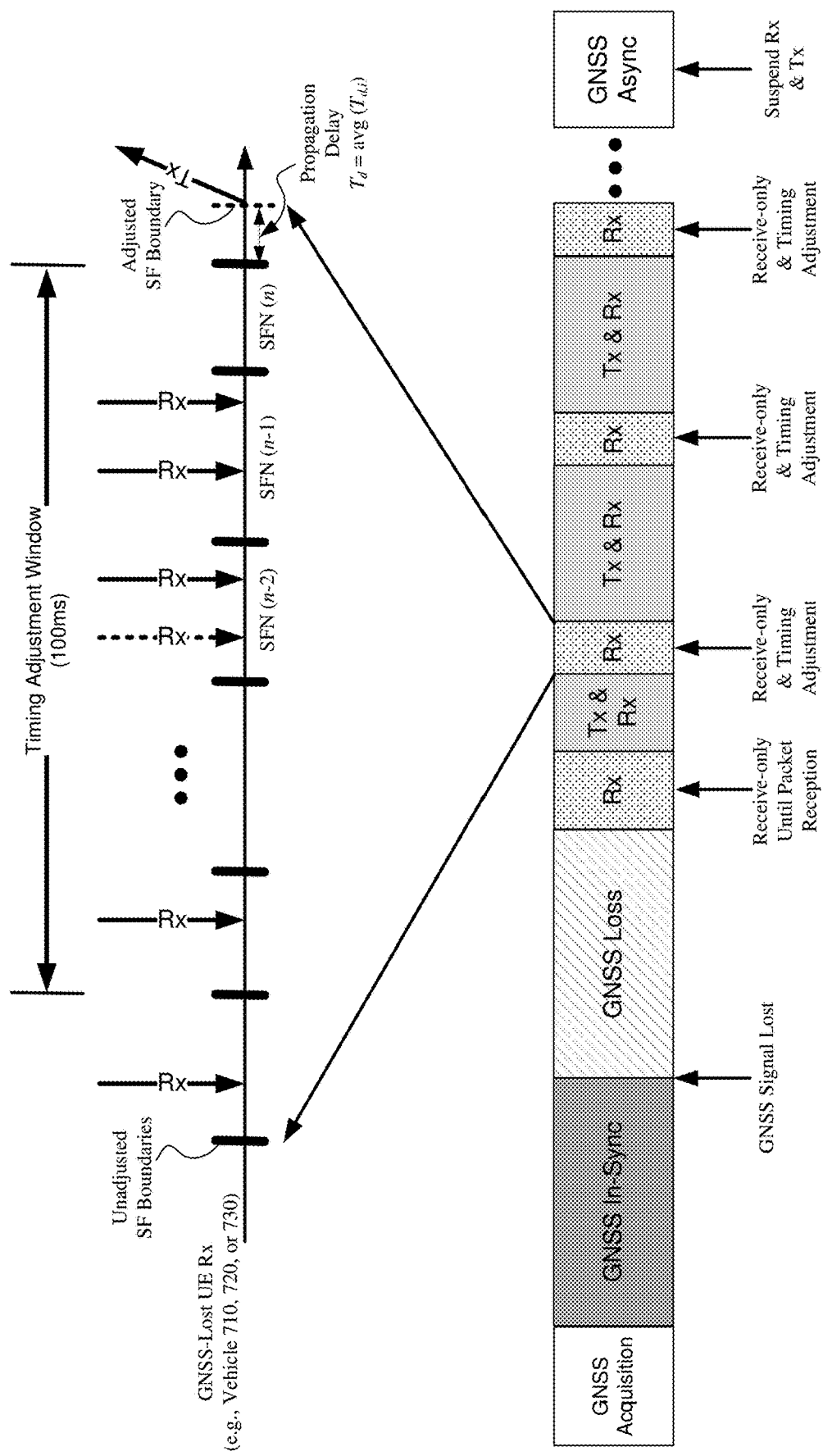
FIG. 22 is a first exemplary UE timing diagram corresponding to performing timing adjustments based on trusted UEs in accordance with aspects disclosed herein.
Figure 23:
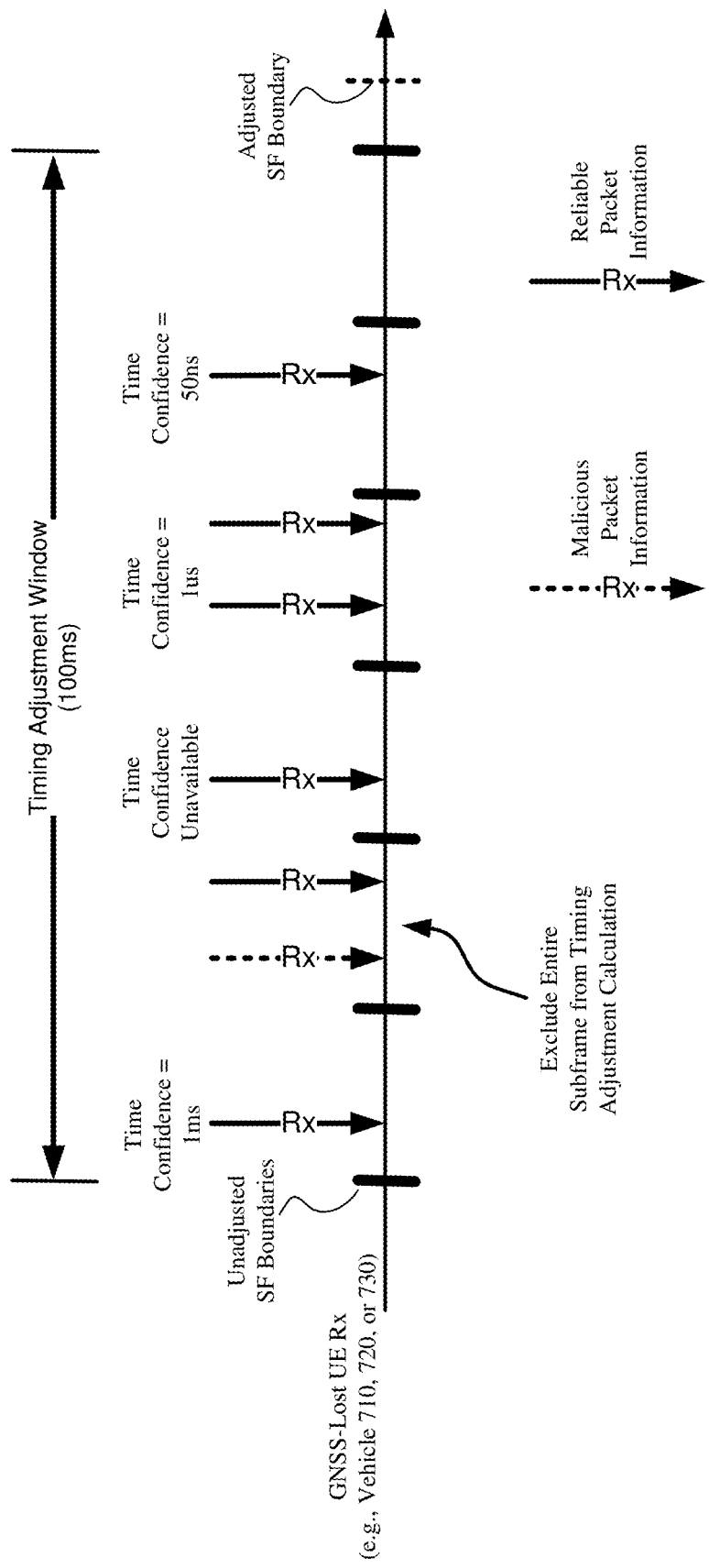
FIG. 23 is a second exemplary UE timing diagram corresponding to performing timing adjustments based on trusted UEs in accordance with aspects disclosed herein.

Referring next to FIGS. 22-23, exemplary UE timing diagrams corresponding to performing timing adjustments based on trusted UEs in accordance with aspects disclosed herein are provided. Here, it is contemplated that lists of rogue UEs/packets may be provided during the timing adjustment window [n-100, n-1]. During this time, it is further contemplated that the UE may be configured to use delay estimates in [n-100-x, n-1-x], where 'x' is the delay obtained from the application processor 1590 for the malicious UEs/packets. In FIG. 22, for example, if SFN (n-2) is identified as rogue, the UE may be configured to exclude delay estimates corresponding to this particular SF.

As previously stated, it is contemplated that the timing adjustment calculations disclosed herein may be further enhanced by using time confidence information. To this end, it should be noted that a time confidence field may be utilized to facilitate using time confidence information, wherein such field may be standardized by industry-specific specifications. Moreover, aspects disclosed herein propose introducing a new sync (e.g., GNSS) confidence element and/or time confidence element.

With respect to the acquisition of time confidence information, various aspects are contemplated and disclosed herein. For instance, a UE may be configured to enable this feature only when the UE is OOC from the synchronization signal and operating in a UE-assisted timing adjustment mode. With reference to FIG. 21, it is further contemplated that the modem 1520 may be configured to indicate when the UE is in a UE-assisted timing adjustment mode and whether timing confidence information is required. It is also contemplated that the modem 1520 may provide OTA <SF, SFN> (or <DFN, SF> for V2X) to modem upper layer 1550 for every packet, and that the modem 1520 may be further configured to cache the <SFN, SF> and <SRC L2 address> of each packet. The application processor 1590 may then be configured to provide the time confidence information of <SRC L2 address> or <SFN, SF> to the modem 1520. For multiple transport blocks (wherein a "transport block" is generally interchangeable with "packet") in a SF, the modem 1520 may use the worst time confidence among the multiple transport blocks (or SRC L2 addresses) for simplicity. Here, it should be appreciated that the utilization of time confidence information may be implementation-specific, wherein the modem 1520 may also be configured to utilize each corresponding time confidence, for example It should also be noted that the hardware, firmware, and/or software of the modem 1520 may utilize timing confidence information for timing adjustments when the synchronization signal (e.g., GNSS, Serving cell/PCell, SyncRef UE) is OOC. For instance, a timing adjustment error may be based on the delay estimation of a received packet, which may be calculated by:

$$\hat{T}_{adjust}{}^{error} = T_{GNSS}{}^{error}(\text{TimeConfidence}) + T_{propagation\ delay} (<3 \ us \ (900 \ m)) + T_{delayEst}{}^{error}$$

Furthermore, it contemplated that delay estimates of received packets in "good" sync may be used (e.g., Time-Confidence <=500 ns). For instance, $\Delta T_{adjust}$ may be calculated according to:

$$\Delta T_{adjust} = \lfloor mean(min(\hat{t}_0^{N-100}, \hat{t}_1^{N-100}, \ldots), \ldots, min(\hat{t}_0^{N-1}, \hat{t}_1^{N-1}, \ldots)) \rfloor_{Func}$$

where $\hat{t}_i^n$ is the $i^{th}$ packet delay estimation of SF n. It should also be noted that if a UE is configured to utilize time confidence information, receive-only periods may not be necessary. Alternatively, a time adjustment $t_n^{adj}$ that combines time confidence information and non-time confidence information is contemplated, wherein $$t_n^{adj} = (1-\alpha)t_{n-1}^{adj} + \alpha \Delta T_{adjust}$$

where $\alpha$ may be set to be bounded by $F_{unc}$.

In another aspect of the disclosure, the use of positional accuracy in a basic safety message (BSM) is contemplated for performing timing adjustments when a synchronization signal is OOC. Particular parameters, such as DF_PositionalAccuracy, for example, may provide errors for the semi-major and semi-minor axes of the error ellipsoid at one standard deviation, as well as the orientation of the semi-major axis. Here, it should be appreciated that positional accuracy may be used to calculate timing adjustments in a manner substantially similar to the aforementioned utilization of time confidence information.

In another aspect of the disclosure, it is contemplated that the timing adjustment calculations disclosed herein may be further enhanced by compensating for propagation delays. For instance, a UE may be configured to enable this feature only when the UE is OOC from the synchronization signal and operating in a UE-assisted timing adjustment mode. With reference to FIG. 21, it is further contemplated that the modem 1520 may be configured to indicate when the UE is in a UE-assisted timing adjustment mode and whether propagation delay compensation is required. It is also contemplated that the modem 1520 may provide OTA <SF, SFN> (or <DFN, SF> for V2X) to modem upper layer 1550 for every packet, and that the modem 1520 may be further configured to cache the <SFN, SF> and <SRC L2 address> of each packet. The application processor 1590 may then be configured to provide the propagation delay between the receiving UE and the transmitting UE to the modem 1520, wherein the BSM may include the position information, and wherein a minimum propagation delay may be used when there are multiple TBs.

An exemplary calculation of a propagation delay in accordance with aspects disclosed herein is now provided with reference to FIG. 10. For this particular example, it is contemplated that a UE may be configured to compensate for propagation delays in the delay estimation. Moreover, it should be noted that the detected packet delay estimation may include a propagation delay as well as other errors, wherein the detected packet delay estimation may be calculated according to:

$$\hat{T}_{adjust}^{error} = T_{GNSS}^{error}(TimeConfidence) + T_{pd}(<3 \text{ us } (900 \text{ m})) + T_{delayEst}^{error}$$

The estimated propagation delay may then be subtracted from the timing adjustment by:

$$\Delta T_{adjust} = \lfloor mean(min(\hat{t}_0^{N-100}, \hat{t}_1^{N-100}, \ldots) -\Delta \hat{t}_{pd}^{N-100}, \ldots, min(\hat{t}_0^{N-1}, \hat{t}_1^{N-1}, \ldots) -\Delta \hat{t}_{pd}^{N-1}) \rfloor_{Func}$$

where $\hat{t}_i^n$ and $\hat{t}_{pd}^n$ is the $i^{th}$ packet delay estimation and propagation delay estimation of SF n, respectively. Also, with propagation delay compensation, it should be noted that timing adjustment between async'd UEs may be relaxed, but the errors will still accumulate.

Figure 24:
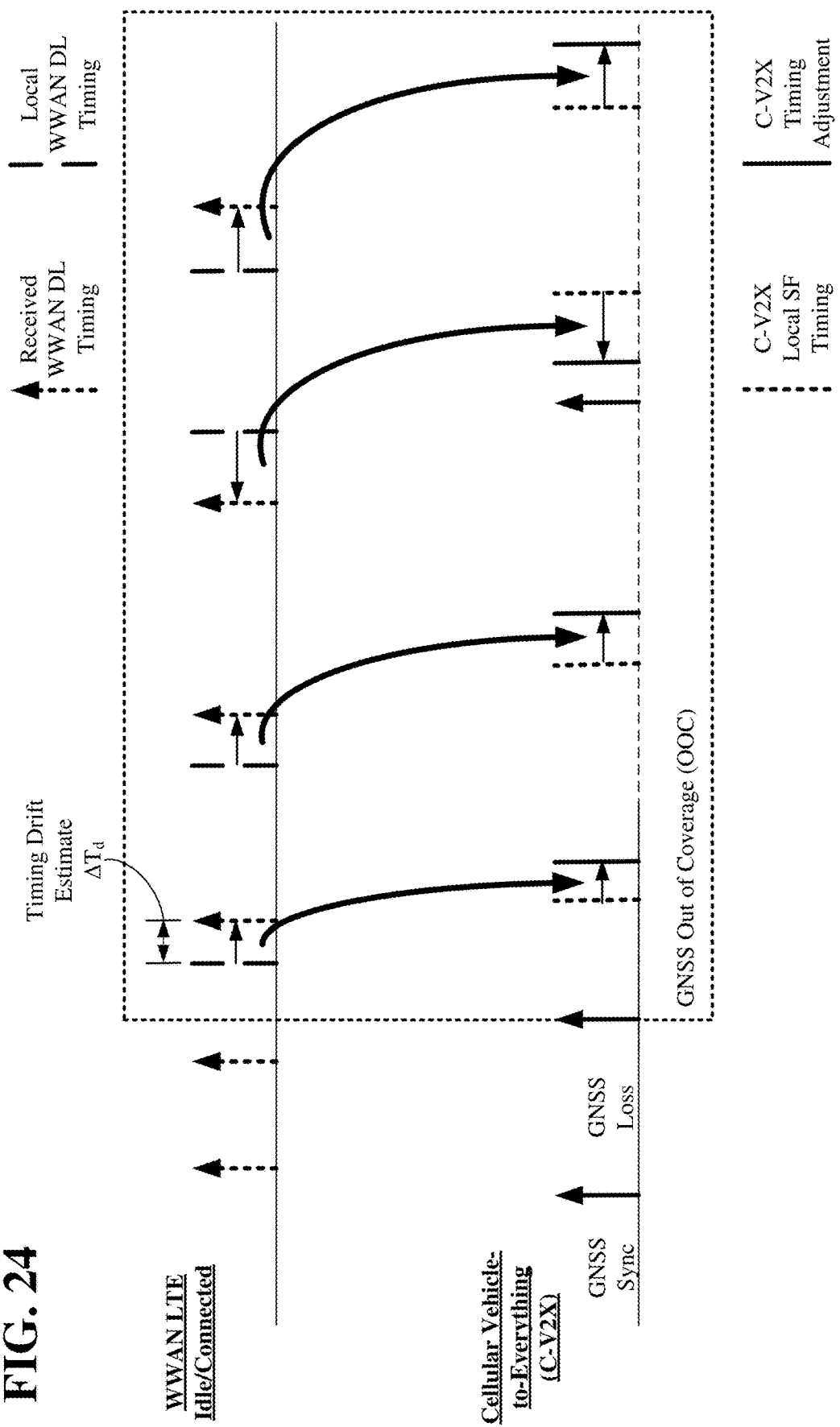
FIG. 24 is an exemplary UE timing diagram illustrating how WWAN DL timing information may be used for timing adjustments in accordance with aspects disclosed herein.

In another aspect of the disclosure, it is contemplated that the timing adjustment calculations disclosed herein may be further enhanced by using WWAN DL timing information. In FIG. 24, an exemplary UE timing diagram is provided illustrating how WWAN DL timing information may be used for timing adjustments when a synchronization signal is OOC. Here, it should be noted that preconditions for utilizing eNB DL reference timing may be applicable. For instance, it may be desirable to only use eNB DL reference timing when the UE is camped/connected in TDD or synced with networks (i.e., when the eNB timing drift is bound). It may also be desirable to only use eNB DL reference timing when a database of a synced network in tracking area levels might be used for checking the network synchronization. It may also be desirable to only use the frequency error correction provided by a WWAN under certain conditions (e.g., under high speed mobility where LTE frequency error <0.3 ppm). It should also be appreciated that the application of a timing adjustment driven by WWAN drift estimation may be given by:

$$\Delta T_d = t_{SF}^{received} - t_{SF}^{local} \rightarrow V2X \ t_{SF}^{local} + \Delta T_d$$

where $\Delta T_d$ is the LTE drift estimate, and wherein it is contemplated that an acceptable mobility or propagation delay impact may be approximately 190 ns for 160 km/hour.

When estimating the timing drift (in USTMR) based on eNB DL SF timing, a UE may use the following:

$$\Delta T_d = t_{DL}^{eNB} - t_{DL}^{UE}$$

when $t_{DL}^{eNB}$ is the detected DL SF timing and $t_{DL}^{UE}$ is the local DL SF timing. The UE may then use:

$$\Delta T_d = \Delta t_{drift} + \Delta t_{pd}$$

when $\Delta t_{drift}$ is the timing drift of the UE and eNB and $\Delta t_{pd}$ is the impact of mobility (i.e., additive propagation delay from the last DL SF detection). For example, when there is a UE speed of 160 km/h and an IDRX cycle of 1.28 sec, and $|\Delta t_{pd}| < 190$ ns, the UE may attempt to compensate for the propagation delay based on extra information about the base station's location. Also, when applying the estimated time drift to C-V2X SF boundary timing $t_{SF}$:

$$\tilde{t}_{SF} = t_{SF} + \Delta t_e$$

where $t_{SF}$ is the local SF boundary timing of C-V2X, and where the combination of eNB DL timing and delay estimation of received packets is the mean of the time correction of both the packet delay estimation and the eNB DL timing.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-24 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   detecting a loss of a synchronization signal associated with vehicle-to-everything (V2X) communications, wherein the loss is detected when a timing uncertainty value or error value is greater than a threshold value;
   initiating a receive-only period in response to detecting the loss of the synchronization signal, wherein the receive-only period comprises a period for receiving one or more V2X transmissions associated with the V2X communications and for abstaining from transmitting another V2X transmission;
   receiving the one or more V2X transmissions including packet timing information from at least one user equipment (UE) synchronized with the synchronization signal during the receive-only period, wherein receiving the one or more V2X transmissions comprises receiving a physical sidelink shared channel (PSSCH) or a physical sidelink control channel (PSCCH) transmission comprising the packet timing information; and
   performing a timing adjustment based on the packet timing information.

2. The method of claim 1, wherein the synchronization signal is a global navigation satellite system (GNSS) signal, a Serving cell/PCell signal, or a SyncRef UE signal.

3. The method of claim 1, wherein the performing of the timing adjustment comprises:
   ascertaining a packet arrival time estimate associated with the receiving of the packet timing information; and
   adjusting a subframe (SF) boundary based on the packet arrival time estimate.

4. The method of claim 1, wherein the performing of the timing adjustment comprises compensating for a propagation delay estimate.

5. The method of claim 1, wherein the performing of the timing adjustment comprises differentiating between reliable packet timing information and malicious packet timing information.

6. The method of claim 1, wherein the performing of the timing adjustment is further based on time confidence information associated with the packet timing information.

7. The method of claim 1, wherein the performing of the timing adjustment is further based on location confidence information associated with the packet timing information.

8. The method of claim 1, wherein the performing of the timing adjustment is further based on a downlink timing drift estimation.

9. The method of claim 1, wherein the performing of the timing adjustment occurs during the receive-only period.

10. The method of claim 1, further comprising limiting an amount of the timing adjustment based on the timing uncertainty value or the error value.

11. The method of claim 1, wherein the receiving comprises receiving packet timing information from a plurality of UEs and wherein performing the timing adjustment comprises performing the timing adjustment based on the packet timing information from the plurality of UEs.

12. The method of claim 11, wherein the performing of the timing adjustment comprises generating a weighted time average based on respective packet timing information received from at least two of the plurality of UEs.

13. The method of claim 12, wherein the generating of the weighted time average is based on a respective signal strength corresponding to each of the at least two of the plurality of UEs.

14. The method of claim 12, wherein the generating of the weighted time average is based on a speed corresponding to each of the at least two of the plurality of UEs.

15. The method of claim 12, wherein the generating of the weighted time average is based on a heading corresponding to each of the at least two of the plurality of UEs.

16. The method of claim 12, wherein the generating of the weighted time average is based on a respective angle of arrival of packet timing information received from each of the at least two of the plurality of UEs.

17. The method of claim 12, wherein the generating of the weighted time average is based on a respective amount of wireless traffic corresponding to each of the at least two of the plurality of UEs.

18. The method of claim 12, wherein the generating of the weighted time average is based on a respective length of continuous reception of packet timing information corresponding to each of the at least two of the plurality of UEs.

19. A wireless communication device comprising:
a transceiver;
a memory; and
a processor coupled to the transceiver and the memory, wherein the processor and memory are configured to:
detect a loss of a synchronization signal associated with vehicle-to-everything (V2X) communications, wherein the loss is detected when a timing uncertainty value or error value is greater than a threshold value,
initiate a receive-only period in response to detecting the loss of the synchronization signal, wherein the receive-only period comprises a period for receiving one or more V2X transmissions associated with the V2X communications and for abstaining from transmitting another V2X transmission,
receive the one or more V2X transmissions including packet timing information from at least one user equipment (UE) synchronized with the synchronization signal during the receive-only period, wherein receiving the one or more V2X transmissions comprises receiving a physical sidelink shared channel (PSSCH) or a physical sidelink control channel (PSCCH) transmission comprising the packet timing information; and
perform a timing adjustment based on the packet timing information.

20. The wireless communication device of claim 19, wherein the processor and memory are configured to detect losing at least one of a global navigation satellite system (GNSS) signal, a Serving cell/PCell signal, or a SyncRef UE signal.

21. The wireless communication device of claim 19, wherein the processor and memory are configured to perform the timing adjustment by:
ascertaining a packet arrival time estimate corresponding to when the packet timing information was received by the transceiver; and
adjusting a subframe (SF) boundary based on the packet arrival time estimate.

22. The wireless communication device of claim 19, wherein the processor and memory are configured to perform the timing adjustment by compensating for a propagation delay estimate.

23. The wireless communication device of claim 19, wherein the processor and memory are configured to perform the timing adjustment by differentiating between reliable packet timing information and malicious packet timing information.

24. The wireless communication device of claim 19, wherein the processor and memory are configured to perform the timing adjustment based on time confidence information associated with the packet timing information.

25. The wireless communication device of claim 19, wherein the processor and memory are configured to perform the timing adjustment based on location confidence information associated with the packet timing information.

26. The wireless communication device of claim 19, wherein the processor and memory are configured to perform the timing adjustment based on a downlink timing drift estimation.

27. The wireless communication device of claim 19, wherein the processor and memory are configured to perform the timing adjustment during the receive- only period.

28. The wireless communication device of claim 19, wherein the processor and memory are configured to limit an amount of the timing adjustment based on the timing uncertainty value or the error value.

29. The wireless communication device of claim 19, wherein the processor and memory are configured to:
receive packet timing information from a plurality of UEs; and
perform the timing adjustment based on the packet timing information from the plurality of UEs.

30. The wireless communication device of claim 29, wherein the processor and memory are configured to perform the timing adjustment by generating a weighted time average based on respective packet timing information received from at least two of the plurality of UEs.

31. The wireless communication device of claim 30, wherein the processor and memory are configured to generate the weighted time average based on a respective signal strength corresponding to each of the at least two of the plurality of UEs.

32. The wireless communication device of claim 30, wherein the processor and memory are configured to generate the weighted time average based on a speed corresponding to each of the at least two of the plurality of UEs.

33. The wireless communication device of claim 30, wherein the processor and memory are configured to generate the weighted time average based on a heading corresponding to each of the at least two of the plurality of UEs.

34. The wireless communication device of claim 30, wherein the processor and memory are configured to generate the weighted time average based on a respective angle of arrival of packet timing information received from each of the at least two of the plurality of UEs.

35. The wireless communication device of claim 30, wherein the processor and memory are configured to generate the weighted time average based on a respective amount of wireless traffic corresponding to each of the at least two of the plurality of UEs.

36. The wireless communication device of claim 30, wherein the processor and memory are configured to generate the weighted time average based on a respective length of continuous reception of packet timing information corresponding to each of the at least two of the plurality of UEs.

37. A non-transitory computer-readable medium storing computer-executable code, the computer-executable code comprising code for causing a wireless communication device to:
- detect a loss of a synchronization signal associated with vehicle-to-everything (V2X) communications, and wherein the loss is detected when a timing uncertainty value or error value is greater than a threshold value;
- initiating a receive-only period in response to detecting the loss of the synchronization signal, wherein the receive-only period comprises a period for receiving one or more V2X transmissions associated with the V2X communications and for abstaining from transmitting another V2X transmission;
- receive the one or more V2X transmissions including packet timing information from at least one user equipment (UE) synchronized with the synchronization signal during the receive-only period, wherein receiving the one or more V2X transmissions comprises receiving a physical sidelink shared channel (PSSCH) or a physical sidelink control channel (PSCCH) transmission comprising the packet timing information; and
- perform a timing adjustment based on the packet timing information.

38. The non-transitory computer-readable medium of claim 37, wherein the computer-executable code comprises code for causing the wireless communication device to perform the timing adjustment by:
- ascertaining a packet arrival time estimate corresponding to when the packet timing information was received by the wireless communication device; and
- adjusting a subframe (SF) boundary based on the packet arrival time estimate.

39. The non-transitory computer-readable medium of claim 37, wherein the computer-executable code comprises code for causing the wireless communication device to perform the timing adjustment by compensating for a propagation delay estimate.

40. The non-transitory computer-readable medium of claim 37, wherein the computer-executable code comprises code for causing the wireless communication device to perform the timing adjustment by differentiating between reliable packet timing information and malicious packet timing information.

41. The non-transitory computer-readable medium of claim 37, wherein the computer-executable code comprises code for causing the wireless communication device to limit an amount of the timing adjustment based on the timing uncertainty value or the error value.

42. The non-transitory computer-readable medium of claim 37, wherein the computer-executable code comprises code for causing the wireless communication device to:
- receive packet timing information from a plurality of UEs; and
- perform the timing adjustment based on the packet timing information from the plurality of UEs.

43. The non-transitory computer-readable medium of claim 42, wherein the computer-executable code comprises code for causing the wireless communication device to perform the timing adjustment by generating a weighted time average based on respective packet timing information received from at least two of the plurality of UEs.

44. The non-transitory computer-readable medium of claim 43, wherein the computer-executable code comprises code for causing the wireless communication device to generate the weighted time average based on a speed corresponding to each of the at least two of the plurality of UEs.

45. The non-transitory computer-readable medium of claim 43, wherein the computer-executable code comprises code for causing the wireless communication device to generate the weighted time average based on a heading corresponding to each of the at least two of the plurality of UEs.

46. An apparatus for wireless communication comprising:
- means for detecting a loss of a synchronization signal from a scheduling entity, wherein the synchronization signal is associated with vehicle-to-everything (V2X) communications, and wherein the loss is detected when a timing uncertainty value or error value is greater than a threshold value;
- means for initiating a receive-only period in response to detecting the loss of the synchronization signal, wherein the receive-only period comprises a period for receiving one or more V2X transmissions associated with the V2X communications and for abstaining from transmitting another V2X transmission;
- means for receiving the one or more V2X transmissions including packet timing information from at least one user equipment (UE) synchronized with the synchronization signal during the receive-only period, wherein receiving the one or more V2X transmissions comprises receiving a physical sidelink shared channel (PSSCH) or a physical sidelink control channel (PSCCH) transmission comprising the packet timing information; and
- means for performing a timing adjustment based on the packet timing information.

47. The apparatus of claim 46, wherein the means for performing is configured to perform the timing adjustment during the receive-only period.

48. The apparatus of claim 46, wherein the means for receiving packet timing information is configured to receive packet timing information from a plurality of UEs, and wherein the means for performing is configured to perform the timing adjustment based on the packet timing information from the plurality of UEs.

49. The apparatus of claim 48, wherein the means for maintaining performing is configured to perform the timing adjustment by generating a weighted time average based on respective packet timing information received from at least two of the plurality of UEs.

50. The apparatus of claim 49, wherein the means for performing is configured to generate the weighted time average based on a respective signal strength corresponding to each of the at least two of the plurality of UEs.

51. The apparatus of claim 49, wherein the means for performing is configured to generate the weighted time average based on a respective length of continuous reception of packet timing information corresponding to each of the at least two of the plurality of UEs.

* * * * *